(12) United States Patent
Nakayama et al.

(10) Patent No.: US 7,240,152 B2
(45) Date of Patent: *Jul. 3, 2007

(54) METHOD OF CONTROLLING STORAGE DEVICE CONTROLLING APPARATUS, AND STORAGE DEVICE CONTROLLING APPARATUS

(75) Inventors: Shinichi Nakayama, Kanagawa (JP); Hiroshi Ogasawara, Kanagawa (JP); Naotaka Kobayashi, Kanagawa (JP); Jinichi Shikawa, Chiba (JP); Nobuyuki Saika, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,172

(22) Filed: Dec. 10, 2004

(65) Prior Publication Data

US 2005/0149667 A1    Jul. 7, 2005

Related U.S. Application Data

(63) Continuation of application No. 10/758,617, filed on Jan. 13, 2004, now Pat. No. 6,900,553.

(30) Foreign Application Priority Data

Jan. 20, 2003   (JP) ............................. 2003-011593

(51) Int. Cl.
  *G06F 12/00* (2006.01)
  *G06F 11/00* (2006.01)
(52) U.S. Cl. .................. 711/112; 711/114; 711/170; 714/7

(58) Field of Classification Search .................. 710/5, 710/40, 74, 36; 711/112, 113, 114, 162, 711/165
See application file for complete search history.

(56) References Cited

U.S. PATENT DOCUMENTS

| 5,140,592 | A | 8/1992 | Idleman et al. |
| 5,517,632 | A * | 5/1996 | Matsumoto et al. ........ 711/114 |
| 6,157,963 | A | 12/2000 | Courtright et al. |
| 6,578,109 | B1 | 6/2003 | Stone et al. |
| 6,609,180 | B2 | 8/2003 | Sanada et al. |
| 6,728,849 | B2 | 4/2004 | Kodama |
| 2002/0046321 | A1 * | 4/2002 | Kanai et al. ................ 711/113 |

(Continued)

*Primary Examiner*—Reginald Bragdon
*Assistant Examiner*—Mehdi Namazi
(74) *Attorney, Agent, or Firm*—Townsend and Townsend and Crew LLP

(57) ABSTRACT

In a storage device controlling apparatus which includes: a plurality of channel controllers having a circuit board on which are formed a file access processing section receiving from an information processing apparatus requests to input and output data in files as units via a network and an I/O processor outputting to a storage device I/O requests corresponding to the requests to input and output data; and a disk controller executing input and output of data into and from the storage device in response to the I/O requests sent from the I/O processors, at least one of the channel controllers receives data specifying an assignment of a logical volume to the channel controller, the data being sent from the information processing apparatus, and stores the received assignment.

20 Claims, 32 Drawing Sheets

U.S. PATENT DOCUMENTS

| | | |
|---|---|---|
| 2002/0124124 A1 | 9/2002 | Matsumoto et al. |
| 2002/0152339 A1* | 10/2002 | Yamamoto .................... 710/36 |
| 2002/0178143 A1* | 11/2002 | Fujimoto ....................... 707/1 |
| 2003/0037204 A1 | 2/2003 | Ash et al. |
| 2003/0105767 A1* | 6/2003 | Sonoda et al. .............. 707/100 |
| 2003/0110254 A1 | 6/2003 | Fujita et al. |
| 2003/0135782 A1* | 7/2003 | Matsunami et al. ........... 714/5 |
| 2003/0182504 A1 | 9/2003 | Nielsen et al. |
| 2003/0196037 A1 | 10/2003 | Obars et al. |
| 2003/0196055 A1 | 10/2003 | Kamano et al. |
| 2003/0221077 A1 | 11/2003 | Ohno et al. |
| 2003/0225982 A1 | 12/2003 | Fujita et al. |
| 2003/0229522 A1* | 12/2003 | Thompson et al. ............ 705/4 |
| 2004/0030766 A1* | 2/2004 | Witkowski .................. 709/223 |
| 2004/0123068 A1 | 6/2004 | Hashimoto |
| 2004/0128456 A1 | 7/2004 | Kobayashi et al. |
| 2004/0133718 A1* | 7/2004 | Kodama et al. ............... 710/74 |
| 2005/0198433 A1* | 9/2005 | Kobayashi et al. ......... 711/112 |

* cited by examiner

PHYSICAL DISK MANAGING TABLE 162a

| DISK NUMBER | CAPACITY | RAID | USAGE STATE |
|---|---|---|---|
| #001 | 100GB | 5 | USED |
| #002 | 100GB | 5 | USED |
| #003 | 100GB | 5 | USED |
| #004 | 100GB | 5 | USED |
| #005 | 100GB | 5 | USED |
| #006 | 50GB | — | UNUSED |
| ⋮ | ⋮ | ⋮ | ⋮ |

LU MANAGING TABLE 162b

| LU NUMBER | PHYSICAL DISK | CAPACITY | RAID |
|---|---|---|---|
| #1 | #001,#002,#003,#004,#005 | 100GB | 5 |
| #2 | #001,#002,#003,#004,#005 | 300GB | 5 |
| #3 | #006,#007, | 200GB | 1 |
| ⋮ | ⋮ | ⋮ | ⋮ |

METADATA

| FILE NAME | TOP ADDRESS | CAPACITY | OWNER | UPDATE TIME |
|---|---|---|---|---|
| A | 7BSA | 200MB | X | 0:00 |
| B | 05BF | 50MB | X | 7:57 |
| C | 1F30 | 100MB | Y | 9:15 |
| D | 470B | 100MB | Z | 15:20 |
| ⋮ | ⋮ | ⋮ | ⋮ | ⋮ |

FILE LOCK TABLE

| FILE NAME | LOCK/UNLOCK |
|---|---|
| A | LOCKED |
| B | — |
| C | — |
| D | LOCKED |
| ⋮ | ⋮ |

722

LU LOCK TABLE

| LU | LOCK/UNLOCK |
|---|---|
| SHARED | — |
| 1 | LOCKED |
| 2 | — |
| ⋮ | ⋮ |

| CHANNEL CONTROLLER'S ID | LUN |
|---|---|
| CHN1 | 1, 2, 3 |
| CHN2 | 1, 4, 5 |
| CHN3 | 1, 6, 7 |
| CHN4 | 1, 8 |
| CHF5 | 1, 9 |
| CHF6 | 1, 10 |
| CHA7 | 1, 11 |
| CHA8 | 1, 12 |

| LU NUMBER | WHOLE CAPACITY (GB) | USAGE AMOUNT (GB) | ACCESS FREQUENCY (TIMES/MIN.) |
|---|---|---|---|
| #1 | 10 | 3 | 10 |
| #2 | 20 | 1.5 | 5 |
| #3 | 20 | 2 | 4 |
| #4 | 10 | 2.3 | 4 |
| #5 | 20 | 4.5 | 0 |
| #6 | 20 | 6 | 23 |

[ OK ]  [ CANCEL ]

FIG.20

| TO-BE-COPIED LU (LUN) | TO-BE-COPIED -INTO LU |
|---|---|
| 1 | 10 |
| 2 | 11 |
| 3 | 12 |
| 4 | 13 |
| 5 | 14 |

OK  CANCEL

| TO-BE-COPIED LU (LUN) | TO-BE-COPIED -INTO LU | SPLIT |
|---|---|---|
| 1 | 10 | EXECUTION ▽ |
| 2 | 11 | ▽ |
| 3 | 12 | ▽ |
| 4 | 13 | ▽ |
| 5 | 14 | ▽ |

OK  CANCEL

2100

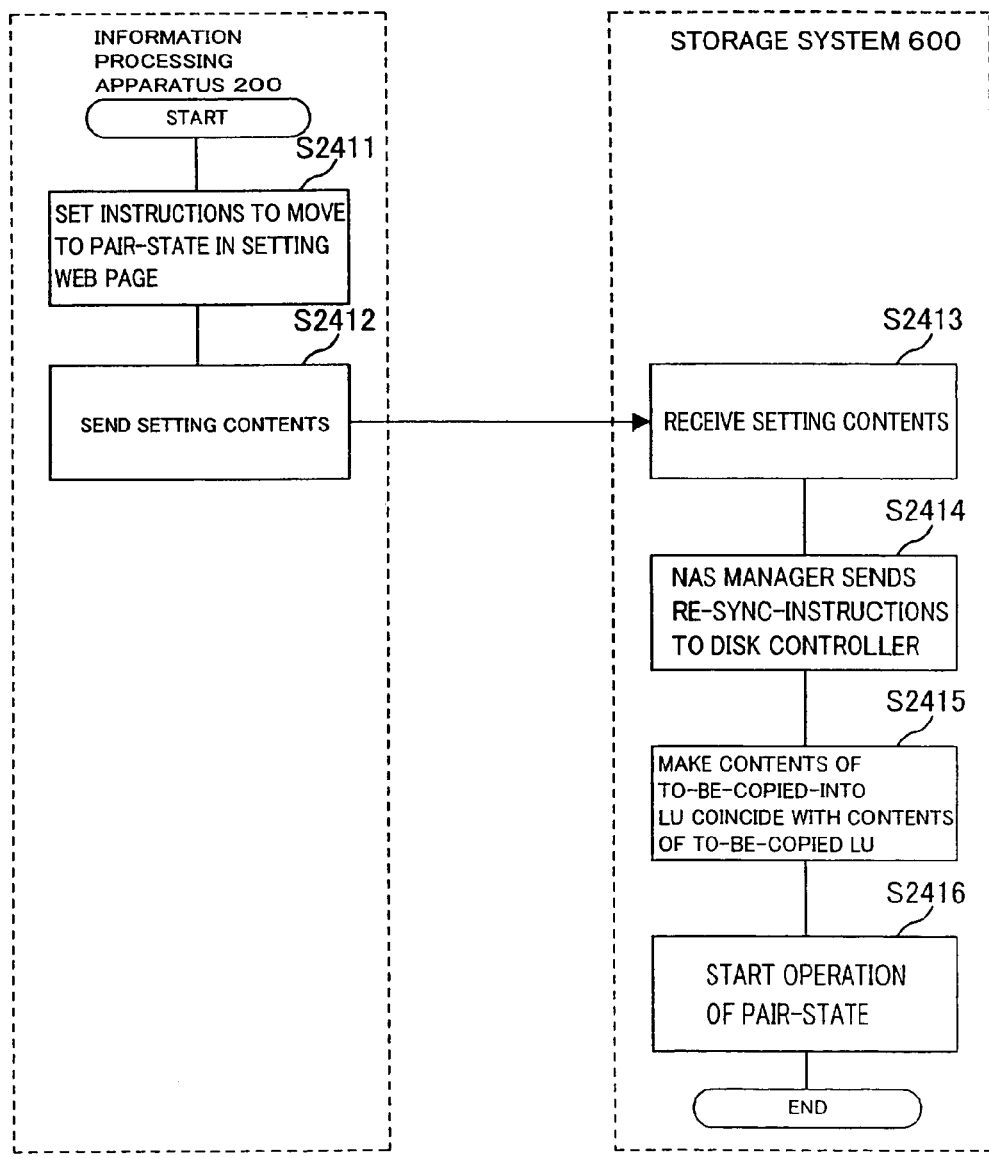

| PRIMARY LU (LUN) | SECONDARY LU(LUN) | MODE |
|---|---|---|
| 1 | 10 | SYNCHRONOUS ▽ |
| 2 | 11 | ASYNCHRONOUS ▽ |
| 3 | 12 | ASYNCHRONOUS ▽ |
| 4 | 13 | ASYNCHRONOUS ▽ |
| 5 | 14 | SYNCHRONOUS ▽ |

OK   CANCEL

FIG.32

NAME

3200

| FILE | DIRECTORY NAME |
|---|---|
| FILE1 | DIR1 |
| FILE2 | DIR2 |
| FILE3 | |
| FILE4 | |

OK   CANCEL

METHOD OF CONTROLLING STORAGE DEVICE CONTROLLING APPARATUS, AND STORAGE DEVICE CONTROLLING APPARATUS

CROSS-REFERENCE TO RELATED APPLICATIONS

The present application is a continuation of U.S. patent application Ser. No. 10/758,617, filed Jan. 13, 2004 (now U.S. Pat. No. 6,990,553), which claims priority upon Japanese Patent Application No. 2003-011593 filed on Jan. 20, 2003, which is herein incorporated by reference.

BACKGROUND OF THE INVENTION

1. Field of the Invention

The present invention relates to a method of controlling a storage device controlling apparatus, and a storage device controlling apparatus.

2. Description of the Related Art

In recent years, the amount of data handled by computer systems has been greatly increased. As storage systems for managing these data, large-scale storage systems called a mid-range class or enterprise class, managed according to a RAID (Redundant Arrays of Inexpensive Disks) method which provides an enormous storage source, are drawing attention these days. Moreover, to efficiently manage the enormous amount of data, a technology has been developed, in which an exclusive network (Storage Area Network; hereinafter referred to as SAN) connects information processing apparatuses and a storage system such as a disk array apparatus to implement high-speed and massive access to the storage system.

Meanwhile, a storage system called a NAS (Network Attached Storage) has been developed, in which a network using TCP/IP (Transmission Control Protocol/Internet Protocol) protocols, etc., connects a storage system and information processing apparatuses to implement access in file level from the information processing apparatuses (e.g., Japanese Patent Application Laid-Open Publication No. 2002-351703).

However, a conventional NAS has been achieved by connecting information processing apparatuses having TCP/IP communication and file system functions to a storage system without TCP/IP communication and file system functions. Therefore, installation spaces have been required for the abovementioned information processing apparatuses to be connected. Moreover, the information processing apparatuses and storage system are usually connected by a SAN in order to perform high-speed communication. Thus, the information processing apparatus has been required to be provided with a communication controlling apparatus or a communication controlling function.

SUMMARY OF THE INVENTION

The present invention was made in view of the abovementioned problems, and the main object of the present invention is to provide a method of controlling a storage device controlling apparatus, and a storage device controlling apparatus.

The main invention according to the present invention for achieving the abovementioned object is a method of controlling a storage device controlling apparatus which includes:

a plurality of channel controllers having a circuit board on which are formed a file access processing section receiving requests to input and output data in files as units from an information processing apparatus via a network and an I/O processor outputting to a storage device I/O requests corresponding to the requests to input and output data; and a disk controller executing input and output of data into and from the storage device in response to the I/O requests sent from the I/O processors, and which manages a memory area provided by the storage device in logical volumes, which are memory areas logically set on the memory area, the method comprising the steps of:

receiving, by at least one of the channel controllers, data specifying an assignment of a logical volume to the channel controller, the data being sent from the information processing apparatus; and storing the received assignment by the at least one channel controller.

Note that the information processing apparatus is, for example, a personal computer or a mainframe computer which accesses a storage system comprising the storage device controlling apparatus having the abovementioned structure via LAN or SAN. The function of the file access processing section is provided by an operating system executed on CPU and software such as NFS (Network File System) which runs on this operating system. The storage device is a disk drive such as a hard disk unit. The I/O processor comprises, for example, an IC (Integrated Circuit) separate from the CPU as a hardware element, which is the hardware element of the file access processing section, and controls the communication between the file access processing section and the disk controller. The disk controller writes and reads data into and from the storage device.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 13 is a view showing metadata according to the present embodiment;

FIG. 14 is a view showing a lock table according to the present embodiment;

FIG. 16 shows the setting Web page used in assigning LUs to channel controllers according to the present embodiment;

FIG. 20 shows the setting Web page used in setting correspondence between to-be-copied LUs and to-be-copied-into LUS where copies of data in the respective to-be-copied LU are stored, according to the present embodiment;

FIG. 21 shows the setting Web page used in instructing the change from a "pair state" to a "split state", according to the present embodiment;

FIG. 23 shows a setting Web page used in instructing the change from the "split state" to the "pair state", according to the present embodiment;

FIG. 24 is a flow chart explaining the process associated with the change from the "split state" to the "pair state", according to the present embodiment;

FIG. 31 shows the setting Web page used in the setting of correspondence between primary LUs and secondary LUs for a remote copy function, according to the present embodiment;

FIG. 32 shows a setting Web page used in selecting for individual files and directories whether or not the remote copy function is applied thereto, according to the present embodiment;

DETAILED DESCRIPTION OF THE INVENTION

Figure 1:
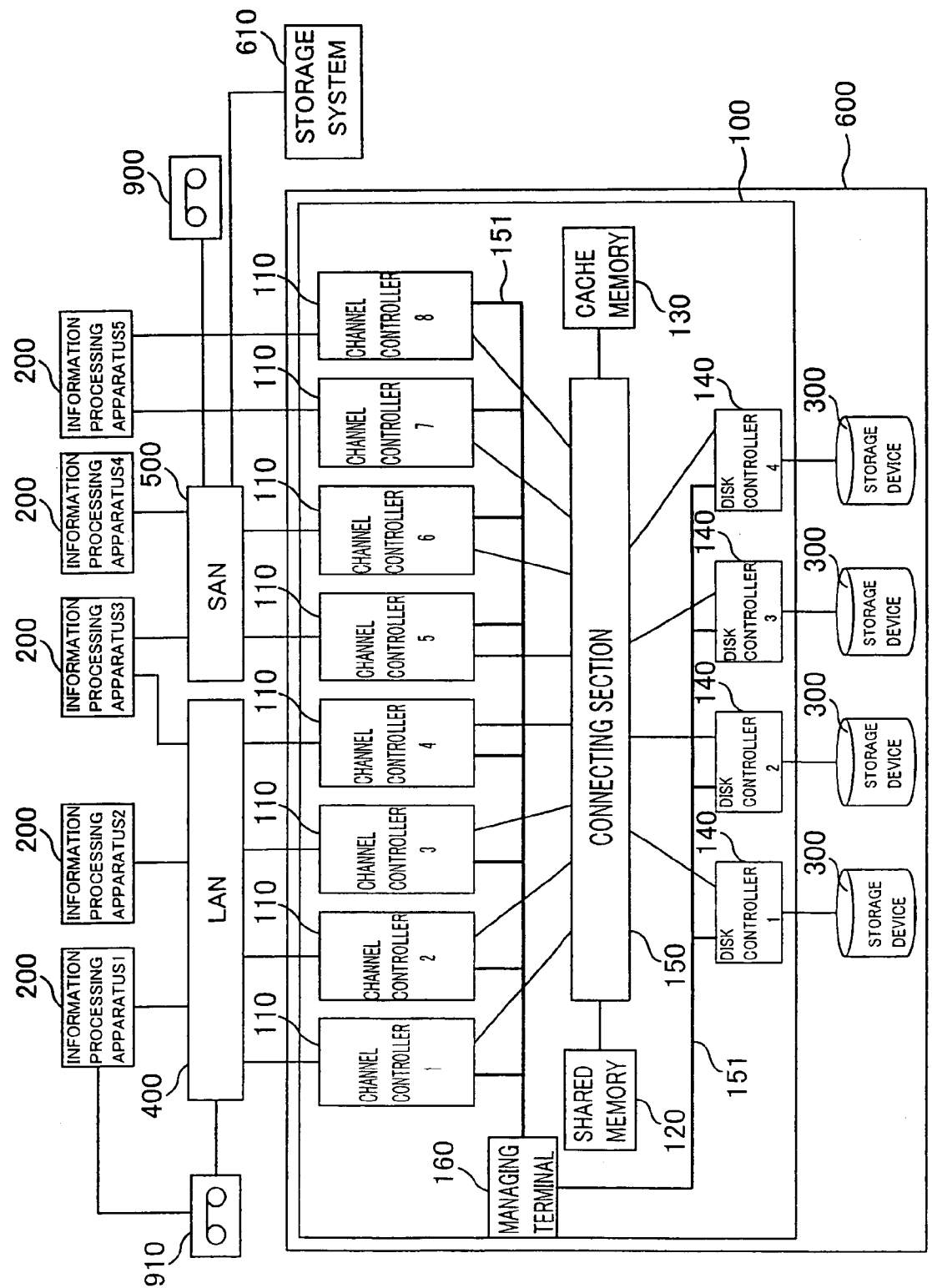
FIG. 1 is a block diagram showing the whole construction of a storage system according to the present embodiment.

At least the following matters will be made clear by the explanation in the present specification and the description of the accompanying drawings.

Example of the Entire Construction

The storage system 600 comprises a storage device controlling apparatus 100 and storage devices 300. The storage device controlling apparatus 100 controls the storage devices 300 according to commands received from information processing apparatuses 200. For example, when requests to input and output data are received from a information processing apparatus 200, the storage device controlling apparatus 100 performs processing for the input and output of data stored in a storage device 300. Data is stored in a memory area, a logical unit (hereinafter, referred to as LU) logically set in a physical memory area provided by the disk drive of the storage device 300. The storage device controlling apparatus 100 also receives various commands from the information processing apparatuses 200 to manage the storage system 600.

The information processing apparatus 200 is a computer having a CPU (Central Processing Unit) and a memory. Execution of various programs by the CPU provided in the information processing apparatus 200 implements various functions. The information processing apparatus 200 is, for example, a personal computer, a workstation or a mainframe computer.

In FIG. 1, the information processing apparatuses 1 to 3 (200) are connected to the storage device controlling apparatus 100 via a LAN (Local Area Network) 400. The LAN 400 may be the Internet or an exclusive network. Communication between the information processing apparatuses 1 to 3 (200) and the storage device controlling apparatus 100 is performed via the LAN 400 according to, for example, TCP/IP protocols. The information processing apparatuses 1 to 3 (200) send the storage system 600 data access requests with specified file names (requests to input and output data in terms of files; hereinafter referred to as file access requests).

The LAN 400 is connected to a backup device 910, which is specifically a disk-based device such as MO, CD-R or DVD-RAM, or a tape-based device such as a DAT tape, cassette tape, open tape or cartridge tape. The backup device 910 communicates with the storage device controlling apparatus 100 via the LAN 400 to store backup data for data stored in the storage device 300. Further, the backup device 910 can also be connected to the information processing apparatus 1 (200). In this case, backup data for data stored in the storage device 300 is acquired via the information processing apparatus 1 (200).

The storage device controlling apparatus 100 comprises channel controllers 1 to 4 (110). By the channel controllers 1 to 4 (110), the storage device controlling apparatus 100 communicates with the information processing apparatuses 1 to 3 (200) and the backup device 910 via the LAN 400. The channel controllers 1 to 4 (110) individually accept file access requests from the information processing apparatuses 1 to 3 (200). That is, the channel controllers 1 to 4 (110) are assigned respective network addresses on the LAN 400 (e.g., IP addresses), and each behaves as a NAS so that each channel controller can provide service as NAS to the information processing apparatuses 1 to 3 (200) as if separate NASs were present. Hereinafter, the channel controllers 1 to 4 (110) are each referred to as CHN. Thus, one storage system 600 is constructed to have the channel controllers 1 to 4 (110), which individually provide service as the NAS, and thereby NAS servers, which are operated individually on separate computers in the conventional art, are integrated into one storage system 600. Therefore, the entire storage system 600 can be managed so that various settings and controls, and maintenance such as fault management and version management are made more efficient.

Note that the functions of the channel controllers 1 to 4 (110) of the storage device controlling apparatus 100 according to the present embodiment are implemented by hardware formed on an integrally unitized circuit board and software such as an operating system (hereinafter, referred to as OS) executed by this hardware and application programs running on this OS, as described later. Thus, the functions of the storage system 600 according to the present embodiment, which are implemented as part of hardware in the conventional art, are implemented mainly by software. Hence, the storage system 600 according to the present embodiment enables flexible system operation and can provide more finely tuned services to meet diverse and greatly varying user needs.

The information processing apparatuses 3, 4 (200) are connected to the storage device controlling apparatus 100 via a SAN (Storage Area Network) 500. The SAN 500 is a network for the storage device controlling apparatus 100 to exchange data with the information processing apparatuses 3, 4 (200) in blocks, units for managing data in the memory area provided by the storage device 300. The communication between the information processing apparatuses 3, 4 (200) and the storage device controlling apparatus 100 via the SAN 500 is performed usually according to a Fibre-Channel protocol. The information processing apparatuses 3, 4 (200) send requests to access data (hereinafter, referred to as block access requests) to the storage system 600 in blocks according to the Fibre-Channel protocol.

The SAN 500 is connected to a backup device 900 compatible with SAN, which communicates with the storage device controlling apparatus 100 via the SAN 500 to store backup data for data stored in the storage device 300.

The storage device controlling apparatus 100 comprises channel controllers 5, 6 (110). By the channel controllers 5, 6 (110), the storage device controlling apparatus 100 communicates with the information processing apparatuses 3, 4 (200) and the backup device 900 compatible with SAN via the SAN 500. Hereinafter, the channel controllers 5, 6 (110) are referred to as CHFs.

The information processing apparatus 5 (200) is connected to the storage device controlling apparatus 100 directly without a network such as the LAN 400 and the SAN 500. The information processing apparatus 5 (200) may be, for example, a mainframe computer. The communication between the information processing apparatus 5 (200) and the storage device controlling apparatus 100 is performed according to a communication protocol such as FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark). The information processing apparatus 5 (200) sends the storage system 600 block access requests according to the communication protocol.

The storage device controlling apparatus 100 communicates with the information processing apparatus 5 (200) by the channel controllers 7, 8 (110). Hereinafter, the channel controllers 7, 8 (110) are referred to as CHAs.

The SAN 500 is connected to another storage system 610 installed at a place (secondary site) remote from the place (primary site) where the storage system 600 is installed. The storage system 610 is used as a unit into which data is duplicated by a function of undermentioned remote copy or replication. It is noted that the storage system 610 may also be connected to the storage system 600 via a communication line such as ATM, instead of the SAN 500. In this case, a channel controller 110 provided with an interface (channel extender) for using the abovementioned communication line is adopted.

According to the present embodiment, by installing CHNs 110, CHFs 110, and CHAS 110 together in the storage system 600, a storage system connected to different types of networks can be implemented. Specifically, the storage system 600 is a SAN-NAS integrated storage system, which is connected to the LAN 400 via CHNs 110 and to the SAN 500 via CHFs 110.

Storage Device

The storage device 300 comprises multiple disk drives (physical disks) and provides a memory area to the information processing apparatus 200. Data is stored in an LU, a memory area logically set on a physical memory area provided by the disk drive. Various units such as a hard disk unit, a flexible disk unit and a semiconductor memory unit can be used as the disk drive.

Note that the storage device 300 can be, for example, a disk array formed of a plurality of disk drives. In this case, the memory area may be provided to the information processing apparatus 200 by the plurality of disk drives managed by a RAID.

The storage device controlling apparatus 100 and the storage devices 300 may be connected directly as shown in FIG. 1 or via a network. Alternatively, the storage devices 300 may be integrated with the storage device controlling apparatus 100.

LUs set in the storage device 300 include user LUs accessible from the information processing apparatuses 200, a system LU used for controlling a channel controller 110, and the like. Stored in the system LU is an operating system executed in a CHN 110. Each LU is made correspond to a channel controller 110, and thereby each channel controller 110 is assigned accessible LUs. In the correspondence, a plurality of channel controllers 110 can share one LU. Hereinafter, the user LU and the system LU are also referred to as a user disk and a system disk, respectively. An LU shared by a plurality of channel controllers 110 is referred to as a shared LU or a shared disk.

Storage Device Controlling Apparatus

The storage device controlling apparatus 100 comprises the channel controllers 110, a shared memory 120, a cache memory 130, disk controllers 140, a managing terminal 160, and a connecting section 150.

The channel controller 110 comprises a communication interface to communicate with the information processing apparatuses 200 and a function to receive data input and output commands, etc., with the information processing apparatuses 200. For example, the CHNs 110 accept file access requests from the information processing apparatuses 1 to 3 (200) and obtain the memory addresses and data lengths of the files to output I/O requests corresponding to the file access requests so as to access storage devices 300. Accordingly, the storage system 600 can provide service as a NAS to the information processing apparatuses 1 to 3 (200). Note that the I/O request includes the top address, data length, and type of access such as read or write, of data. When data is to be written, the I/O request may include data to be written. I/O requests are outputted by an I/O processor 119 described later. The CHFS 110 accept block access requests from the information processing apparatuses 3, 4 (200) according to the Fibre-Channel protocol. Thus, the storage system 600 can provide high-speed accessible data storage service to the information processing apparatuses 3, 4 (200). The CHAs 110 accept block access requests from the information processing apparatus 5 (200) according to a protocol such as FICON, ESCON, ACONARC, or FIBARC. Accordingly, the storage system 600 can provide data storage service to the information processing apparatus 5, a mainframe computer.

The channel controllers 110 and the managing terminal 160 are connected by an internal LAN 151. Accordingly, micro-programs, etc., executed by the channel controllers 110 can be sent from the managing terminal 160 and installed therein. The construction of the channel controllers 110 is described later.

The connecting section 150 connects the channel controllers 110, the shared memory 120, the cache memory 130, and the disk controllers 140. Data and commands are sent and received to and from the channel controllers 110, the shared memory 120, the cache memory 130, and the disk controllers 140 via the connecting section 150. The connecting section 150 is, for example, a high-speed bus such as a superfast cross bus switch which transmits data by high-speed switching. Since the channel controllers 110 are connected each other by the high-speed bus, the communication performance between the channel controllers 110 is greatly improved over the conventional construction where the NAS servers operating on individual computers are connected via a LAN. This enables a high-speed file sharing function, high-speed fail-over, and the like.

The shared memory 120 and the cache memory 130 are memories shared by the channel controllers 110 and the disk controllers 140. The shared memory 120 is mainly used to store control information, commands, etc., while the cache memory 130 is mainly used to store data.

For example, when a data input and output command received by a channel controller 110 from an information processing apparatus 200 is a write command, the channel controller 110 writes the write command into the shared memory 120 and data received from the information processing apparatus 200 into the cache memory 130. Meanwhile, the disk controllers 140 are monitoring the shared memory 120. When the disk controllers 140 detect that the write command has been written into the shared memory 120, one of the disk controllers 140 reads the data from the cache memory 130 and writes the data into a relevant storage device 300 according to the command.

When a data input and output command received by a channel controller 110 from an information processing apparatus 200 is a read command, the channel controller 110 writes the read command into the shared memory 120 and checks whether to-be-read data is present in the cache memory 130. If the data is present in the cache memory 130, the channel controller 110 sends the data to the information processing apparatus 200. On the other hand, if the to-be-read data is not present in the cache memory 130, a disk controller 140 monitoring the shared memory 120 detects that the read command has been written into the shared memory 120 and reads the to-be-read data from a relevant storage device 300 to write the data into the cache memory 130 and a notice thereof in the shared memory 120. Thereafter, when the channel controller 110 detects that the to-be-read data has been written into the cache memory 130 by monitoring the shared memory 120, the channel controller 110 sends the data to the information processing apparatus 200.

Note that other than the construction where instructions to write and read data are indirectly sent from the channel controller 110 to the disk controller 140 via the shared memory 120, for example, the storage device controlling apparatus 100 may have construction where instructions to write and read data are sent directly from a channel controller 110 to a disk controller 140 without the shared memory 120.

A disk controller 140 controls a storage device 300. For example, as described above, according to a data write command received from an information processing apparatus 200, a channel controller 110 writes the data into the storage device 300. Further, a request sent from the channel controller 110 to access data in an LU designated by a logical address is converted into a request to access data in a physical disk designated by a physical address. If the physical disks in the storage device 300 are managed by RAID, data is accessed according to the structure of the RAID. Moreover, the disk controller 140 controls management of the duplication and backup of data stored in the storage device 300. Furthermore, the disk controller 140 controls to store duplication of data in the storage system 600 at the primary site into another storage system 610 installed in the secondary site (a replication or remote copy function) for the purpose of preventing data loss in the occurrence of disaster (disaster recovery).

The disk controllers 140 and the managing terminal 160 are connected each other via the internal LAN 151 and can communicate with each other. This enables micro-programs, etc., executed by the disk controllers 140 to be sent from the managing terminal 160 and installed therein. The construction of the disk controllers 140 is described later. In the present embodiment, the shared memory 120 and the cache memory 130 are provided separately from the channel controllers 110 and the disk controllers 140. The present embodiment is not limited to this case. It is also preferable that the shared memory 120 or the cache memory 130 be dispersed to be provided in each of the channel controllers 110 and the disk controllers 140. In this case, the connecting section 150 connects the channel controllers 110 and the disk controllers 140, which have dispersed shared memories or cache memories.

Managing Terminal

The managing terminal 160 is a computer for maintaining and managing the storage system 600. By operating the managing terminal 160, it is possible to set the structure of the physical disks and LUs in the storage device 300 and install micro-programs executed by the channel controllers 110. Herein, in the setting of the structure of the physical disks in the storage device 300, for example, physical disks can be added or removed, and the RAID structure can be changed (e.g., a change from RAID1 to RAID5). Further, via the managing terminal 160, it is possible to perform various operations, including: confirming the operation state of the storage system 600; identifying a fault section; and installing operating systems executed by the channel controllers 110. Yet further, the managing terminal 160 is connected to an external maintenance center via a LAN, a telephone line, etc., so that it is possible to monitor faults in the storage system 600 and quickly deals with faults when occurred by use of the managing terminal 160. The occurrence of faults is notified by, for example, OSs, application programs, driver software, etc. The faults are notified through a HTTP protocol, a SNMP (Simple Network Management Protocol), e-mails and the like. These are set and controlled by an operator and the like via a Web page serving as a user interface provided by a Web server operating on the managing terminal 160. The operator and the like can also designate objects subjected to fault monitoring and set its contents and targets to be notified of faults.

The managing terminal 160 can be incorporated into the storage device controlling apparatus 100 or attached thereto externally. Further, the managing terminal 160 may be a computer which exclusively maintains and manages the storage device controlling apparatus 100 and the storage devices 300 or a general-purpose computer having a maintenance and management function.

Figures 2, 3, 4:
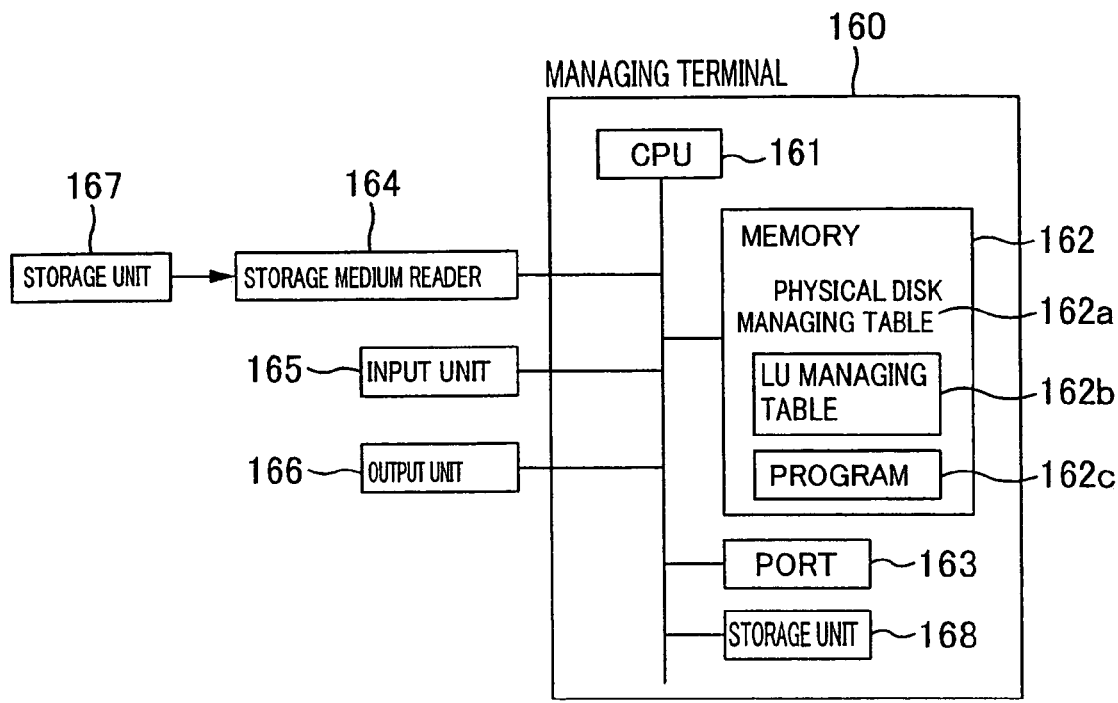
FIG. 2 is a block diagram showing the construction of a managing terminal according to the present embodiment.
FIG. 3 is a view showing a physical disk managing table according to the present embodiment.
FIG. 4 is a view showing a LU managing table according to the present embodiment.

FIG. 2 is a block diagram showing the construction of the managing terminal 1.60.

The managing terminal 160 comprises a CPU 161, a memory 162, a port 163, a storage medium reader 164, an input unit 165, an output unit 166, and a storage unit 168.

The CPU 161 controls the whole managing terminal 160 and implements functions and the like as the abovementioned Web server, etc., by executing a program 162c stored in the memory 162. The memory 162 stores a physical disk managing table 162a, an LU managing table 162b, and the program 162c.

The physical disk managing table 162a is a table for managing the physical disks (disk drives) provided in a storage device/storage devices 300, and is shown in FIG. 3. In FIG. 3, of the multiple physical disks provided in the storage device/storage devices 300, disk numbers #001 to #006 are shown. The capacity, RAID structure, and usage state of each physical disk are shown.

The LU managing table 162b is a table for managing the LUs set logically on the abovementioned physical disks, and is shown in FIG. 4. In FIG. 4, of the multiple LUs set in the storage device 300, LU numbers #1 to #3 are shown. The physical disk number, capacity, and RAID structure of each LU are shown.

The storage medium reader 164 is a unit for reading programs and data stored in a storage medium 167. Read programs and data are stored in the memory 162 or the storage unit 168. Accordingly, for example, the program 162c recorded in the storage medium 167 can be read by use of the storage medium reader 164 and stored in the memory 162 or the storage unit 168. A flexible disk, a CD-ROM, a DVD-ROM, a DVD-RAM, a semiconductor memory, etc., can be used as the storage medium 167. Note that a program for installing the OS 701 and application programs on the channel controllers 110 and disk controllers 140, and an upgrade program can be used as the program 162c, in addition to the program for operating the managing terminal 160.

The storage medium reader 164 can be incorporated into the managing terminal 160 or attached thereto externally. The storage unit 168 is, for example, a hard disk unit, flexible disk unit, and a semiconductor memory unit. The input unit 165 is used by an operator, etc., to enter data, etc., into the managing terminal 160. Used as the input unit 165 is, for example, a keyboard, or a mouse. The output unit 166 is a unit for outputting information to the outside. Used as the output unit 166 is, for example, a display, or a printer. The port 163 is connected to the internal LAN 151, and thereby the managing terminal 160 can communicate with the channel controllers 110, the disk controllers 140 and the like. Further, the port 163 can be connected to the LAN 400 or a telephone line.

Exterior Figure

Figure 5:
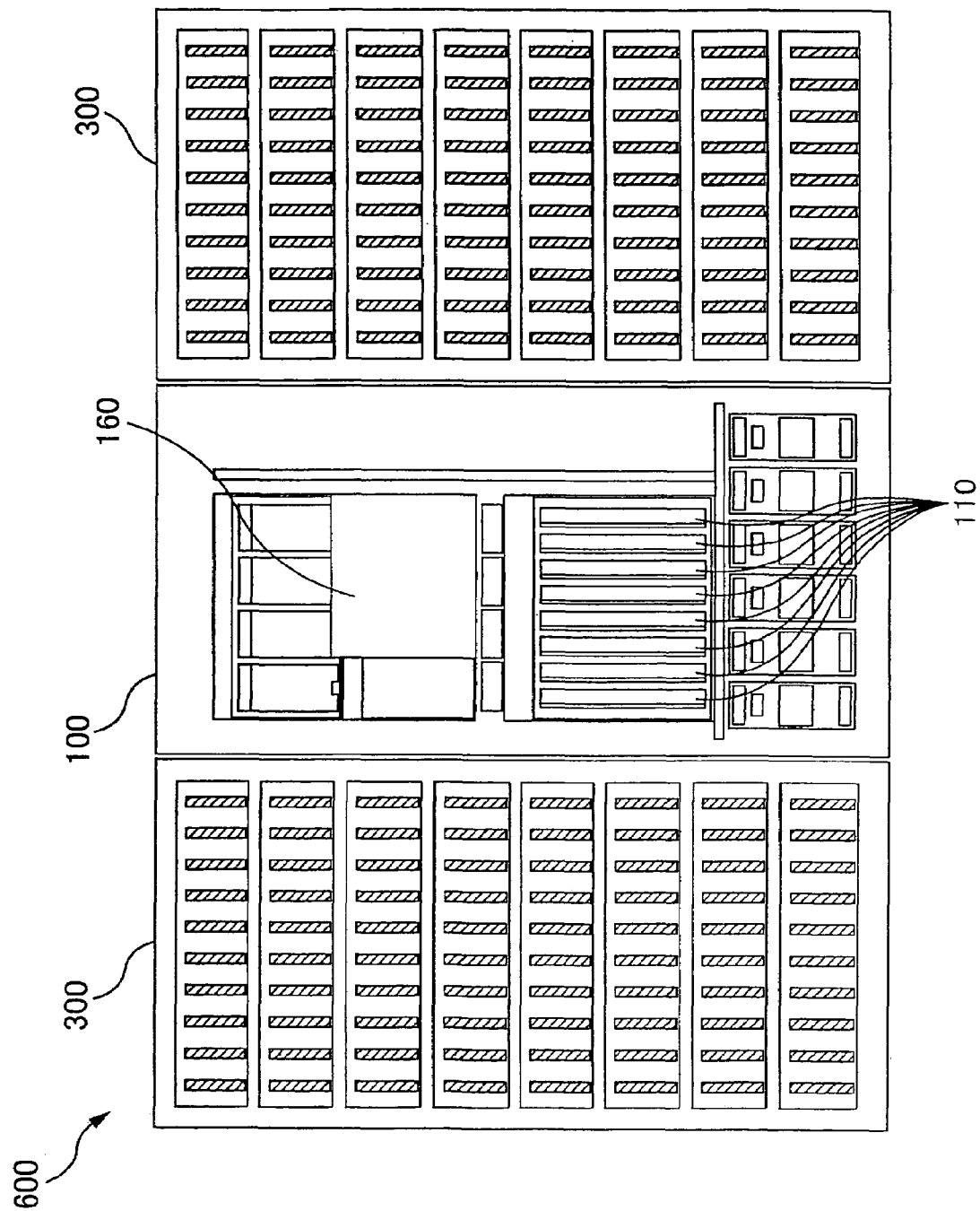
FIG. 5 shows an exterior structure of the storage system according to the present embodiment.
Figure 6:
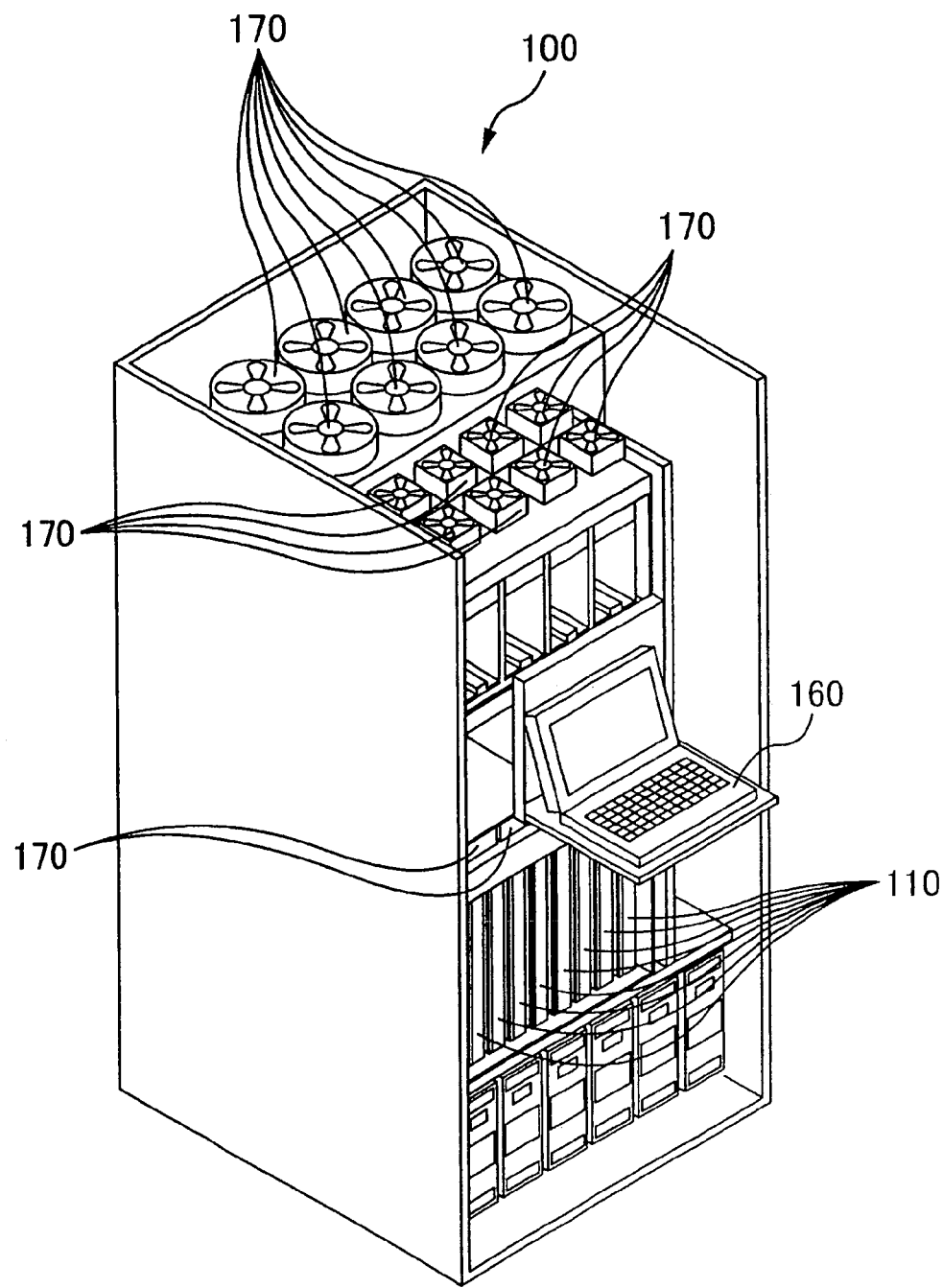
FIG. 6 shows an exterior structure of a storage device controlling apparatus according to the present embodiment.

Next, FIG. 5 shows the exterior structure of the storage system 600 according to the present embodiment, and FIG. 6 shows the exterior structure of the storage device controlling apparatus 100.

As shown in FIG. 5, the storage system 600 according to the present embodiment has the storage device controlling apparatus 100 and the storage devices 300 contained in respective chassis. The chassis for the storage devices 300 are placed on both sides of the chassis for the storage device controlling apparatus 100.

The storage device controlling apparatus 100 comprises the managing terminal 160 provided at the center front. The managing terminal 160 is covered by a cover, and the managing terminal 160 can be used by opening the cover as shown in FIG. 6. Note that while the managing terminal 160 shown in FIG. 6 is a so-called notebook personal computer, it may take any form.

Provided under the managing terminal 160 are slots to which the boards of the channel controllers 110 are to be attached. The board of a channel controller 110 is a unit in which a circuit board of the channel controller 110 is formed, and is an attachment unit to the slots. The storage system 600 according to the present embodiment has eight slots. FIGS. 5 and 6 show a state where the eight slots have the boards of the channel controllers 110 attached thereto. Each slot is provided with guide rails to attach a board of a channel controller 110. By inserting the board of the channel controller 110 into the slot along the guide rails, the board of the channel controller 110 is attached to the storage device controlling apparatus 100. By pulling the board of the channel controller 110 toward the front along the guide rails, the channel controller 110 can be removed. Further, provided on the surface facing forwards in the back of each slot is a connector for connecting a board of a channel controller 110 to the storage device controlling apparatus 100 electrically. The channel controllers 110 are CHNS, CHFs, and CHAs. Since each board of the channel controllers 110 is compatible with the others in size and in the position and pin arrangement of its connector and the like, the eight slots can have any board of the channel controllers 110 attached thereto. Therefore, for example, all the eight slots can have the boards of the CHNs 110 attached thereto. Alternatively, as shown in FIG. 1, the eight slots can have four CHNs 110, two CHFs 110, and two CHAs 110 attached thereto, or some of the slots may have no channel controller 110.

Figure 12:
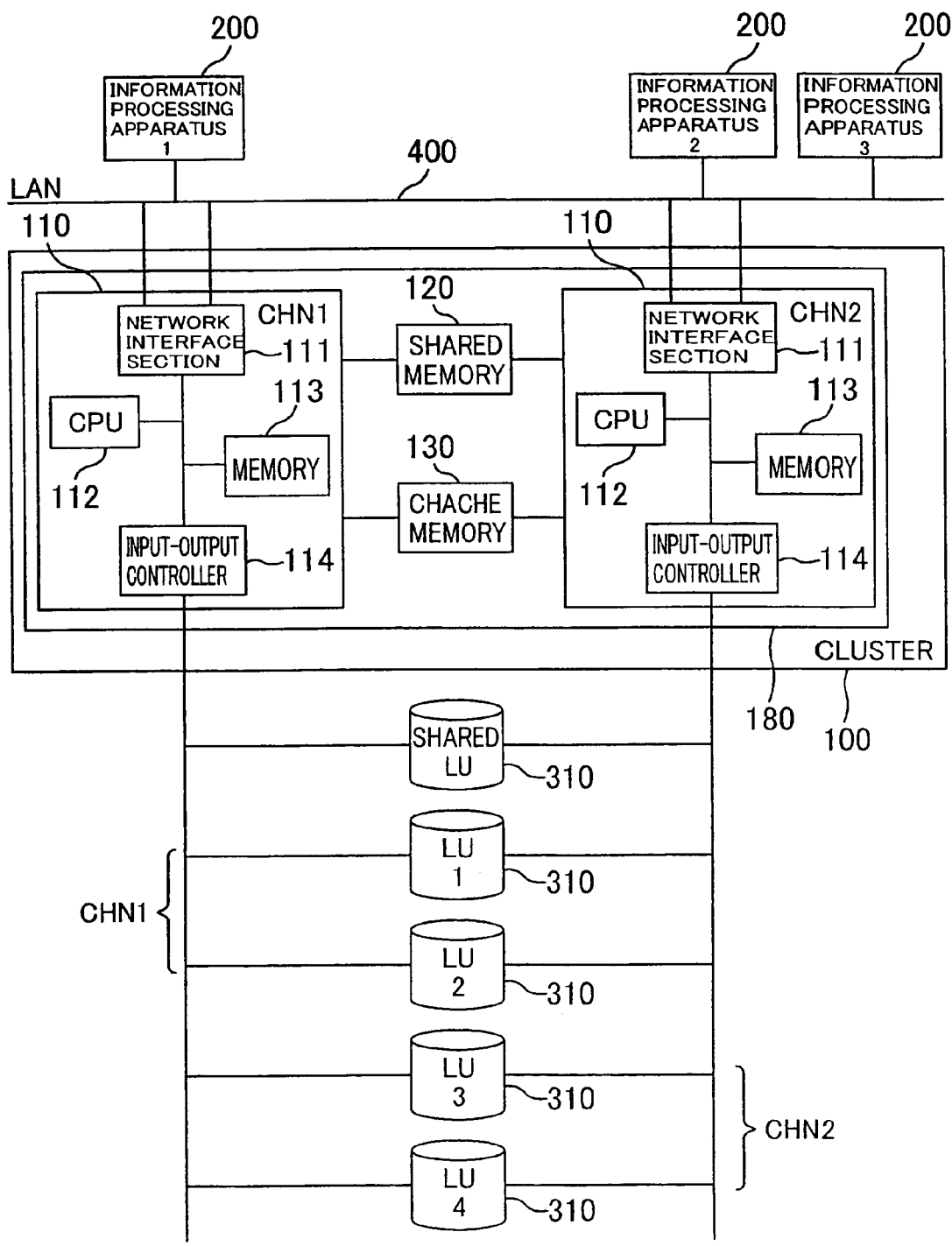
FIG. 12 shows the structure of a cluster in channel controllers according to the present embodiment.

Of the channel controllers 110 attached to the slots, plural channel controllers 110 of the same type constitute a cluster. For example, two CHNs 110 as a pair may constitute a cluster. By constituting a cluster, even when a fault has occurred in a channel controller 110 of the cluster, another channel controller 110 in the cluster may be arranged to take over processing that the channel controller 110, where the fault has occurred, was performing until then (fail-over control). FIG. 12 shows two CHNs 110 constituting a cluster, which is described in detail later.

Note that the storage device controlling apparatus 100 has two systems of power supply to improve reliability, and the abovementioned eight slots, to which channel controllers 110 are attached, are divided into two groups of four for the respective power supply systems. Hence, when forming a cluster, the cluster is arranged to include channel controllers 110 respectively connected to both power supply systems. Thus, even if a failure occurs in one of the power supply systems to stop supplying electric power, electric power continues to be supplied to a board of another channel controller 110 connected to the other power supply system forming part of the same cluster. Therefore, another channel controller 110 can take over the processing from the relevant channel controller 110 (fail-over).

Note that, as described above, while each channel controller 110 is provided as a board that can be attached to any of the slots, the board may include a plurality of circuit boards formed integrally.

Other units forming part of the storage device controlling apparatus 100, such as the disk controllers 140 and the shared memory 120, are not shown in FIGS. 5 and 6, but attached to the back, etc., of the storage device controlling apparatus 100.

The storage device controlling apparatus 100 is provided with fans 170 for releasing heat generated by the boards of the channel controllers 110, etc. The fans 170 are provided on the tops of the slots for the channel controllers 110 as well as on the top of the storage device controlling apparatus 100.

For example, units having conventional structures that are manufactured complying with a SAN can be used as the storage device controlling apparatus 100 and the storage devices 300 contained in respective chassis. In particular, by making the connector's shape of the board of the CHN take such a shape that it can be directly attached to a slot provided in a conventionally structured chassis as described above, the units having conventional structures can be used more easily. The storage system 600 according to the present embodiment can be easily constructed by using the existing products.

Channel Controller

As described above, the storage system 600 according to the present embodiment accepts file access requests from the information processing apparatuses 1 to 3 (200) by CHNs 110, and provides service as a NAS to the information processing apparatuses 1 to 3 (200).

Figure 7:
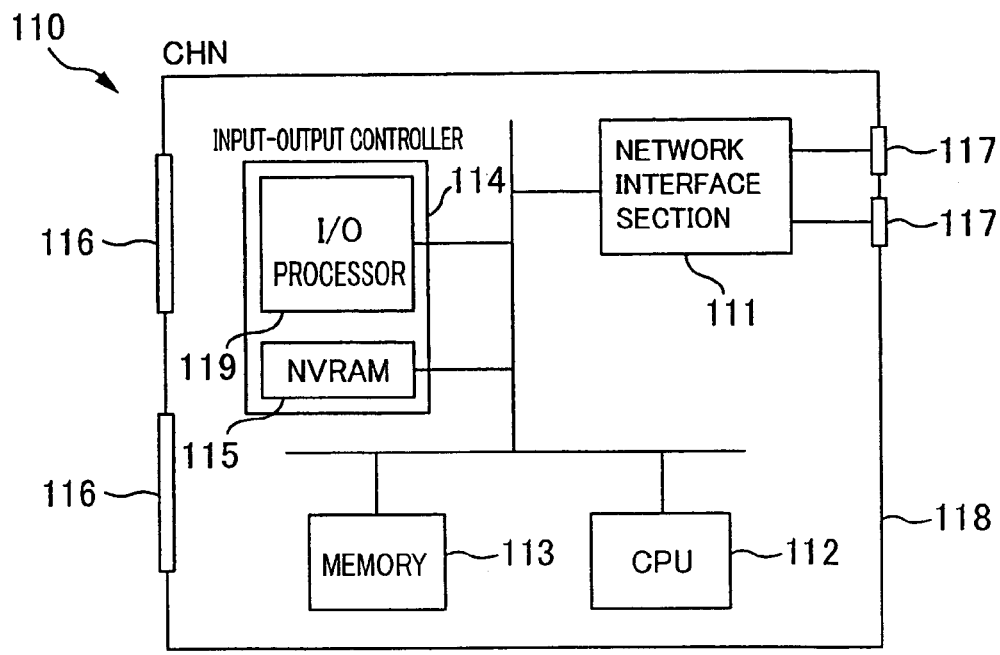
FIG. 7 is a view showing a CHN according to the present embodiment.

The hardware structure of a CHN 110 is shown in FIG. 7. As shown in FIG. 7, the CHN 110's hardware is constituted by a board integrally unitized. Hereinafter, this board is referred to as a NAS board. The NAS board includes one or more circuit boards. More specifically, the NAS board comprises a network interface section 111, a CPU 112, a memory 113, an input-output controller 114, an I/O (Input/Output) processor 119, an NVRAM (Non Volatile RAM) 115, a board connecting connector 116, and a communication connector 117, which are formed as one unit.

The network interface section 111 comprises a communication interface for communicating with the information processing apparatuses 200. In the case of a CHN 110, the communication interface receives file access requests sent from the information processing apparatuses 200 according to, for example, TCP/IP protocols. The communication connector 117 is a connector for communicating with the information processing apparatuses 200. In the case of a CHN 110, the communication connector is a connector that can be connected to the LAN 400 and complies with, for example, Ethernet (registered trademark).

The CPU 112 controls the CHN 110 to function as a NAS board.

Figure 9:
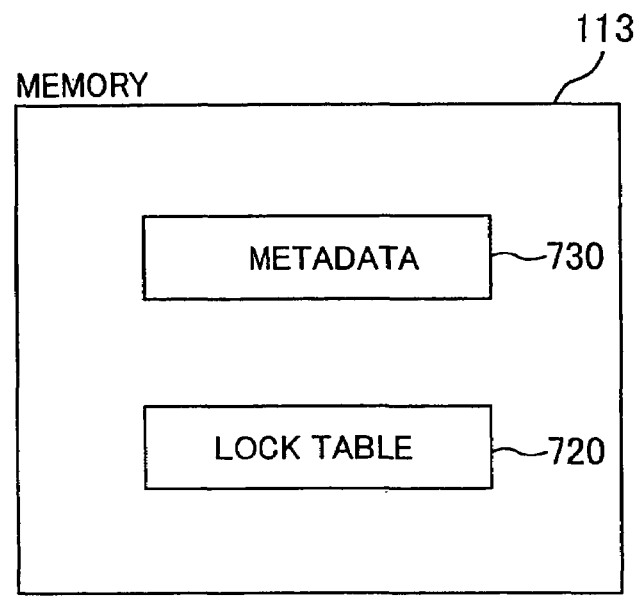
FIG. 9 is a view for explaining the contents of data stored in a memory according to the present embodiment.
Figure 11:
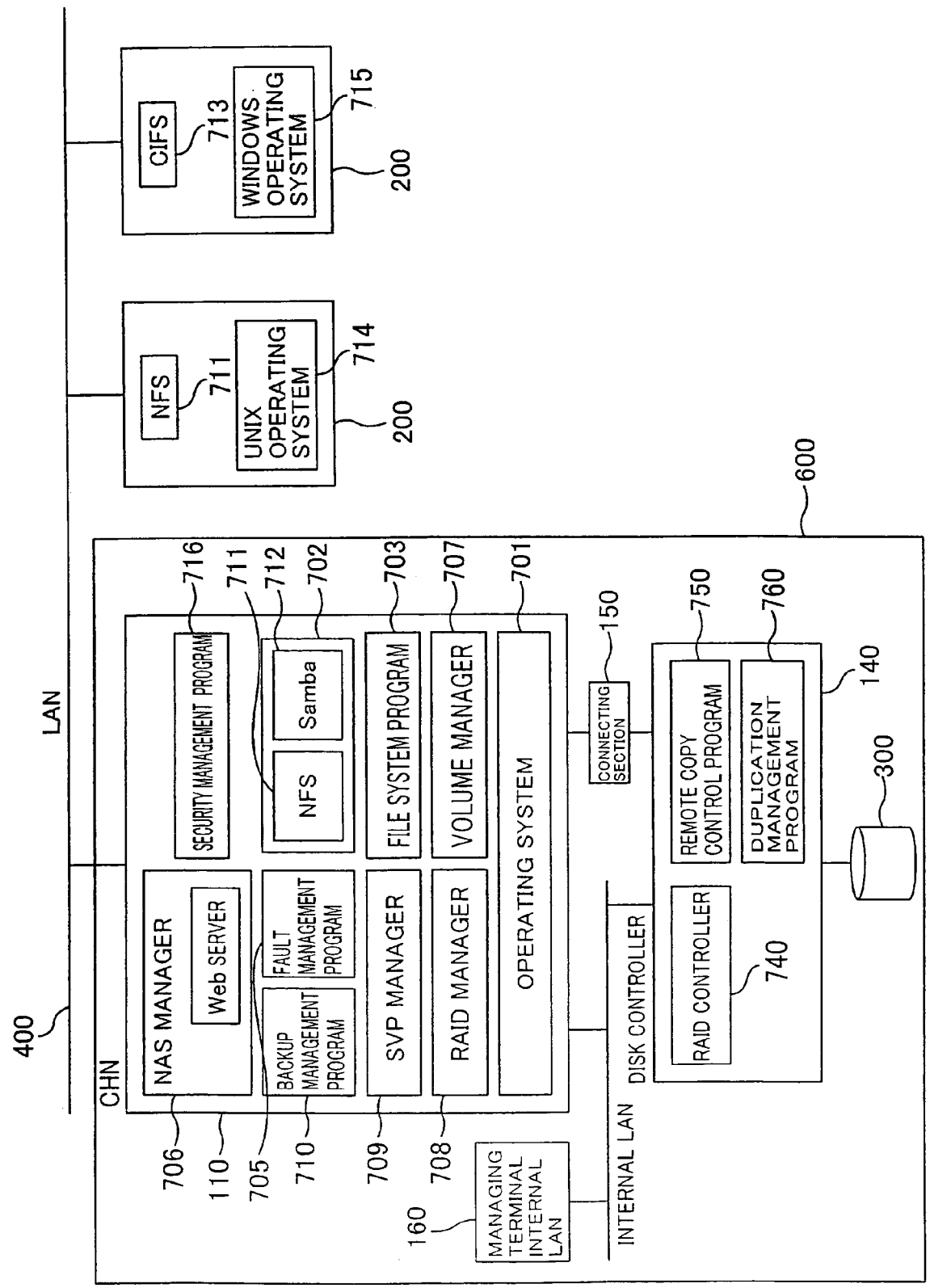
FIG. 11 is a view showing the structure of software according to the present embodiment.

The memory 113 stores various programs and data. For example, metadata 730 and a lock table 720 shown in FIG. 9 and various programs such as a NAS manager 706 shown in FIG. 11 are stored.

The metadata 730 is information created for files managed by a file system implemented by a file system program 703 or the like. The metadata 730 includes information for identifying the storage location of each file such as the address on an LU where the file data is stored and the data size. The metadata 730 includes information on the correspondence between the names of the files managed by the file system and address information (e.g., top address) for identifying the locations of the data, which corresponds to the files, stored on an LU. The metadata 730 may also include the capacity, owner, update time, etc., of each file. Further, the metadata 730 may be created not only for files but also for directories. An example of the metadata 730 is shown in FIG. 13. The metadata 730 is also stored in each LU in the storage device 300.

Figure 15:
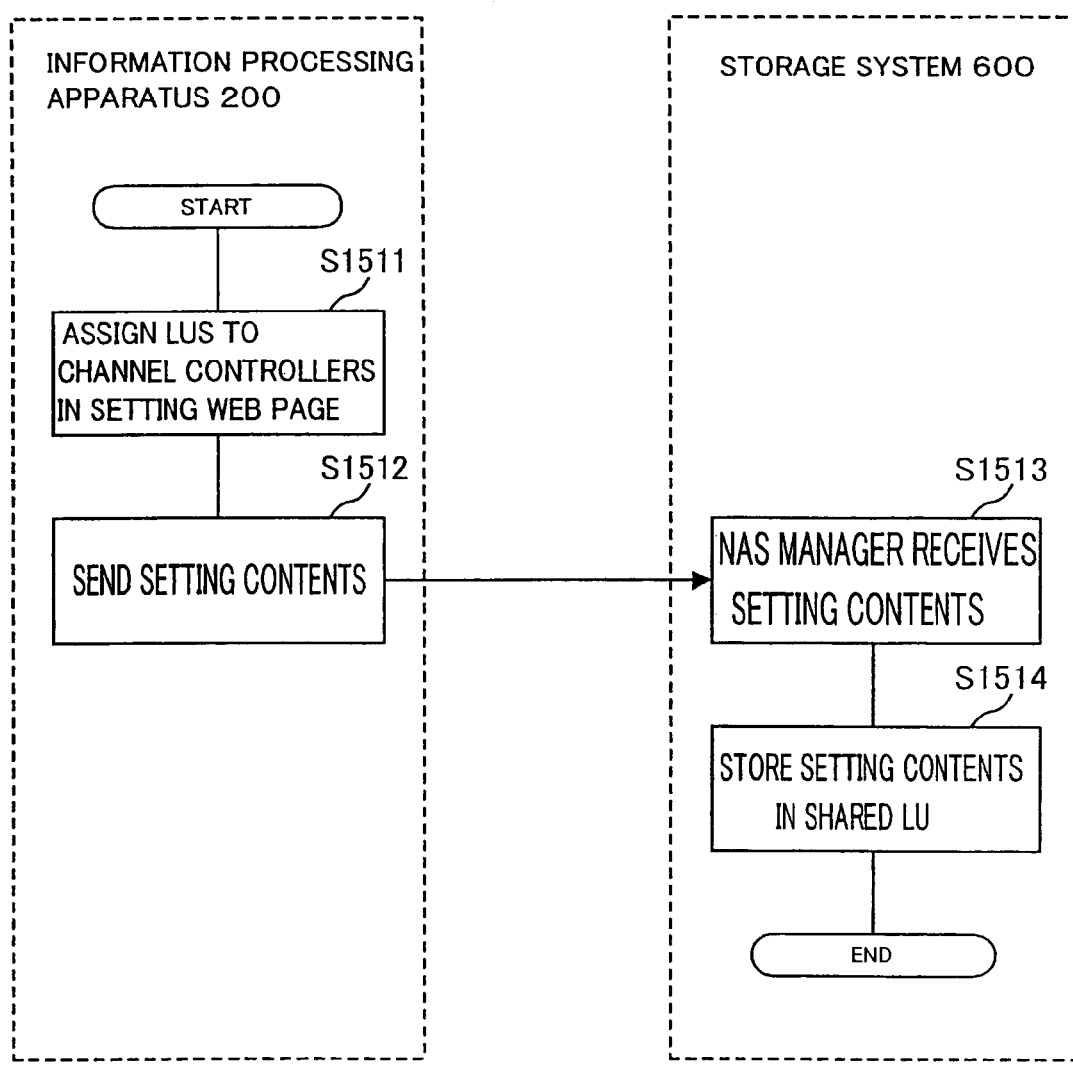
FIG. 15 is a flow chart explaining the process of assigning LUs to channel controllers by use of a setting Web page according to the present embodiment.

The lock table 720 is a table for performing exclusive control on file accesses from the information processing apparatuses 1 to 3 (200). With exclusive access control, the information processing apparatuses 1 to 3 (200) can share files. The lock table 720 is shown in FIG. 15. As shown in the drawing, the lock table 720 includes a file lock table 721 and an LU lock table 722. The file lock table 721 is a table for indicating whether it is locked for each file. When an information processing apparatus 200 has opened a file, the file is locked, to which access from other information processing apparatuses 200 is prohibited. The LU lock table 722 is a table for indicating whether it is locked for each LU. When an information processing apparatus 200 is accessing an LU, the LU is locked, to which access from other information processing apparatuses 200 is prohibited.

The input-output controller 114 sends and receives data and commands to and from the disk controllers 140, the cache memory 130, the shared memory 120, and the managing terminal 160. The input-output controller 114 comprises the I/O processor 119 and the NVRAM 115. The I/O processor 119 is constituted by, for example, a one-chip micro-computer. The I/O processor 119 controls the sending and receiving of data and commands and relays communication between a CPU 112 and the disk controllers 140. The NVRAM 115 is a nonvolatile memory storing a program to control the I/O processor 119. The contents of a program stored in the NVRAM 115 can be written or rewritten according to instructions from the managing terminal 160 or the NAS manager 706 described later.

Figure 8:
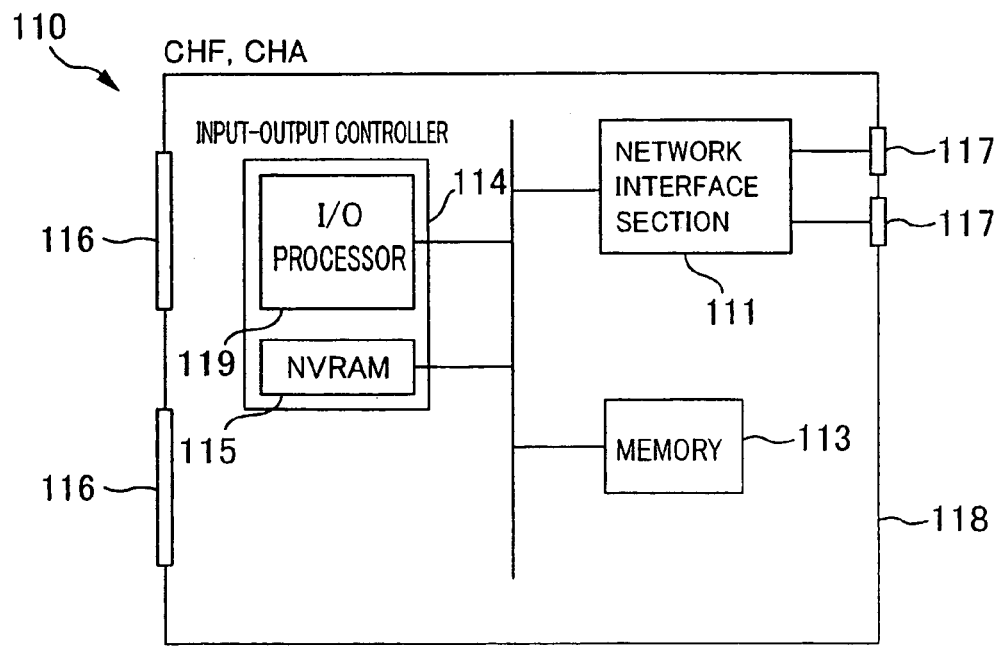
FIG. 8 is a view showing a CHF and CHA according to the present embodiment.

Next, the structures of the CHF 110 and the CHA 110 are shown in FIG. 8. The boards of The CHF 110 and the CHA 110 are also formed as boards integrally unitized in the same way as the CHN 110. Similar to the board of the CHN 110, the board may be constructed from a plurality of circuit boards which are integrally formed. Further, the boards of the CHF. 110 and the CHA 110 are compatible with the board of the CHN 110 in terms of size and the position and pin arrangement of the board connecting connector 116 and the like.

The CHF 110 and the CHA 110 comprise a network interface section 111, a memory 113, an input-output controller 114, an I/O processor 119, an NVRAM (Non Volatile RAM) 115, a board connecting connector 116, and a communication connector 117.

The network interface section 111 comprises a communication interface for communicating with the information processing apparatuses 200. In the case of a CHF 110, the communication interface receives block access requests sent from the information processing apparatuses 200 according to, for example, the Fibre Channel protocol. In the case of a CHA 110, the communication interface receives block access requests sent from the information processing apparatuses 200 according to, for example, FICON (registered trademark), ESCON (registered trademark), ACONARC (registered trademark), or FIBARC (registered trademark) protocol. The communication connector 117 is a connector for communicating with the information processing apparatuses 200. In the case of a CHF 110, the communication connector 117 is a connector that can be connected to the SAN 500 and complies with, for example, the Fibre Channel. In the case of a CHA 110, the communication connector 117 is a connector that can be connected to the information processing apparatus 5 and complies with, for example, FICON (registered trademark), ESCON (registered trademark), ACONARC (registered trademark), or FIBARC (registered trademark).

The input-output controllers 114 control all the CHFs 110 and CHAs 110 and send and receive data and commands to and from the disk controllers 140, the cache memory 130, the shared memory 120, and the managing terminal 160. By executing various programs stored in the memory 113, the functions of the CHFs 110 and CHAs 110 according to the present embodiment are implemented. The input-output controller 114 comprises the I/O processor 119 and the NVRAM 115. The I/O processor 119 controls the sending and receiving of data and commands. The NVRAM 115 is a nonvolatile memory storing a program to control the I/O processor 119. The contents of a program stored in the NVRAM 115 can be written or rewritten according to instructions from the managing terminal 160 or the NAS manager 706 described later.

Figure 10:
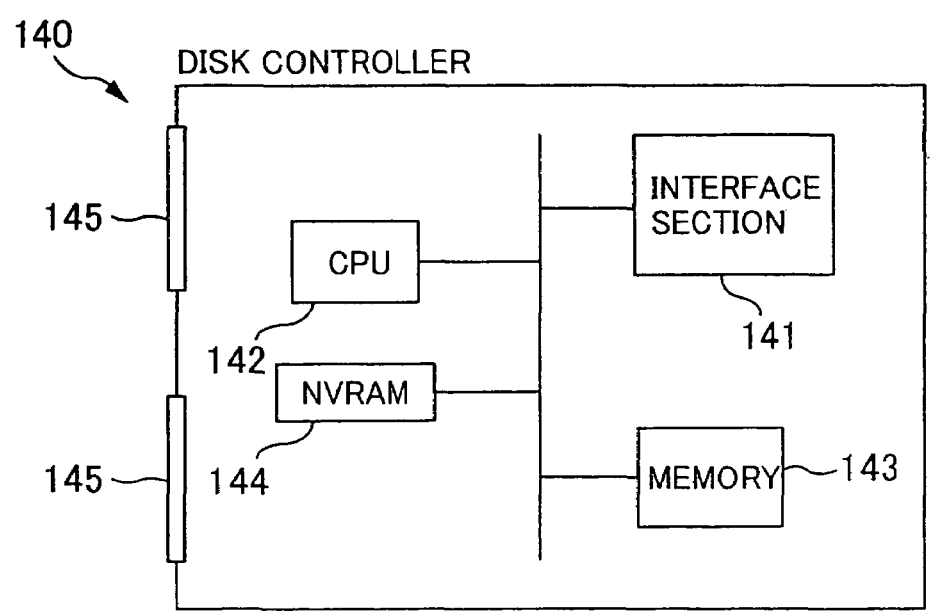
FIG. 10 is a view showing a disk controller according to the present embodiment.

Next, the hardware structure of the disk controllers 140 is shown in FIG. 10.

The disk controller 140 is formed as a board unitized integrally. The board of the disk controller 140 comprises an interface section 141, a memory 143, a CPU 142, an NVRAM 144, and a board connecting connector 145, which are formed as a integrally unitized circuit board.

The interface section 141 comprises a communication interface for communicating with the channel controllers 110, etc., via the connecting section 150, and a communication interface for communicating with the storage device 300.

The CPU 142 controls the entire disk controller 140 and communicates with the channel controllers 110, the storage device 300, and the managing terminal 160. By executing various programs stored in the memory 143 and the NVRAM 144, the functions of the disk controller 140 according to the present embodiment are implemented. The functions implemented by the disk controller 140 are the control of the storage device 300, RAID control, and duplication management, backup control, remote copy control, and the like of data stored in the storage device 300.

The NVRAM 144 is a nonvolatile memory storing a program to control the CPU 142. The contents of a program stored in the NVRAM 144 can be written or rewritten according to instructions from the managing terminal 160 or the NAS manager 706 described later.

The board of the disk controller 140 comprises the board connecting connector 145. By engaging the board connecting connector 145 with the connector on the storage device controlling apparatus 100, the board of the disk controller 140 is connected electrically with the storage device controlling apparatus 100.

Software Structure

Next, the structure of software in the storage system 600 according to present embodiment is shown in FIG. 11.

Running on an operating system 701 is software including a RAID manager 708, a volume manager 707, a SVP manager 709, a file system program 703, a network controller 702, a backup management program 710, a fault management program 705, and an NAS manager 706.

The RAID manager 708 running on the operating system 701 provides functions to set parameters for RAID controllers 740 and to control the RAID controllers 740. The RAID manager 708 accepts parameters and control instructions information from the operating system 701, and other applications and the SVP running on the operating system 701, sets the accepted parameters into a RAID controller 740, and sends the RAID controller 740 control commands corresponding to the control instruction information.

Herein, the set parameters include, for example, parameters for defining storage devices (physical disks) forming a RAID group (specifying RAID group's structure information, stripe size, etc.), a parameter for setting a RAID level (e.g., 0, 1, or 5), and the like. Examples of the control commands which the RAID manager 708 sends to a RAID controller 740 are commands instructing to configure and delete a RAID and to change the capacity thereof, and a command requesting structure information of each RAID group.

The volume manager 707 provides virtualized logical volumes, into which LUs provided by the RAID controller 740 are further virtualized, to the file system program 703. A virtualized logical volume is composed of more than one logical volume.

The main function of the file system program 703 is to manage the correspondence between file names designated in file access requests received by the network controller 702 and addresses on virtualized logical volumes in which the files are stored. For example, the file system program 703 identifies the address on a virtualized logical volume corresponding to a file name designated by a file access request.

The network controller 702 comprises two file system protocols, a NFS (Network File System) 711 and a Samba 712. The NFS 711 accepts a file access request from a UNIX (registered trademark)-based information processing apparatus 200 on which the NFS 711 runs. On the other hand, the Samba 712 accepts a file access request from a Windows (registered trademark)-based information processing apparatus 200 on which a CIFS (Common Interface File System) 713 runs.

The NAS manager 706 is a program for confirming, setting, and controlling the operation state of the storage system 600. The NAS manager 706 has a function as a Web server and provides a setting Web page for the information processing apparatuses 200 to set and control the storage system 600. The setting Web page is provided by the NAS manager 706 which runs in each of the channel controllers 1 to 4 (110). In response to HTTP (HyperText Transport Protocol) requests from the information processing apparatuses 1 to 3 (200), the NAS manager 706 sends data of the setting Web page to the information processing apparatuses 1 to 3 (200). By use of the setting Web page displayed in the information processing apparatuses 1 to 3 (200), a system administrator, etc., instructs to set and control the storage system 600.

The NAS manager 706 receives data concerning settings and controls sent from an information processing apparatus 200 due to the operation of the setting Web page and performs the settings and controls corresponding to the data. Thus, various settings and controls of the storage system 600 can be performed from the information processing apparatuses 1 to 3 (200). Further, the NAS manager 706 notifies the OS and application programs which run on the channel controllers 110, and disk controllers 140, etc., of the contents of the settings in the setting Web page. The contents set in the setting Web page may be managed by a shared. LU 310.

Things that can be done by use of the setting Web page are, for example, LU management and setting (capacity management, capacity expansion and reduction, user assignment, etc.); the setting and control (setting of the addresses of the to-be-copied and the to-be-copied-into) concerning functions such as duplication management and remote copy (replication); the setting and control of the backup management program 710 described later; the management of redundantly structured clusters of CHNs, CHFs and CHAs (setting of the correspondence between the channel controllers, whereby, when one fails, another fails over; a fail-over method; etc.); version management of the OS and application programs running on the OS; and the management and setting of the operation state of a security management program 716 and update management (version management) of the security management program 716 providing functions concerning security of data, such as a virus detection program and virus extermination.

The backup management program 710 is a program for backing up data stored in the storage devices 300 via LAN or SAN. The backup management program 710 provides a function of an NDMP (Network Data Management) protocol and communicates, according to the NDMP, with backup software complying with the NDMP operating on an information processing apparatus 200 via the LAN 400. When a backup device 910 is connected to the information processing apparatus 200 via a SCSI, etc., data to be backed up is once read by the information processing apparatus 200 and sent to the backup device 910. When the backup device 910 is connected to the LAN 400, data to be backed up may be transferred to the backup device 910 from the storage system 600 directly without an information processing apparatus 200.

The fault management program 705 is a program for controlling fail-over between the channel controllers 110 which form a cluster.

FIG. 12 shows a cluster 180 constituted of two CHNs 110. FIG. 12 shows a case where the cluster 180 is composed of a CHN 1 (channel controller 1) 110 and a CHN 2 (channel controller 2) 110.

As previously mentioned, the fail-over processing is performed between the channel controllers 110 constituting the cluster 180. That is, if any fault occurs in CHN 1 (110) and it becomes impossible to continue a processing, the CHN 2 (110) takes over the processing that has been performed by the CHN 1 (110). The fault management program 705 executed by the CHN 1 (110), and the CHN 2 (110) implements the fail-over processing.

Both CHN 1 (110) and CHN 2 (110) execute the fault management program, write in, for example, the shared memory 120 to indicate that the processing thereof is normally performed, and confirm each other whether the other has written. When one cannot detect the writing by the other, the one determines that a fault has occurred in the other and performs fail-over processing. In the fail-over processing, the processing that has been performed by the other is taken over via a shared LU 310.

Fail-over may be automatically performed in this way or manually performed by an operator operating the managing terminal. Alternatively, a user may manually perform failover via an information processing apparatus 200 by use of the setting Web page provided by the NAS manager 706. The manual fail-over operation is performed, for example, when the hardware (e.g. the NAS board) of a channel controller 110 needs to be replaced because of wear, upgrade, periodic diagnosis and the like.

The SVP manager 709 provides the managing terminal 160 with various services according to requests from the managing terminal 160. For example, the SPV manager 709 provides the managing terminal with the contents of various settings concerning the storage system 600 such as the settings of LUs or a RAID, and makes reflected therein the various settings concerning the storage system 600 entered from the managing terminal 160.

The security management program 716 implements functions of detecting computer viruses, monitoring invasion thereof, update management of a computer virus detection program, extermination of viruses infected a computer, firewall, and the like.

Assignment of LUs to Channel Controllers

By use of a setting Web page, the channel controllers 1 to 8 (110) can be assigned to LUs. FIG. 15 is a flow chart for explaining the processing performed in the assigning or setting by an information processing apparatus 200 and the storage system 600. FIG. 16 shows a setting Web page used in the setting. By entering LUNs (Logical Unit Numbers), which are identifiers of LUs, into a setting column in the setting Web page 1600 for the channel controllers 110, the assignment of LUs to the channel controllers 110 can be specified. Here, when an LU of the same LUN is assigned to a plurality of channel controllers 110, the same LU will be shared by the plurality of channel controllers 110. After the setting in the setting Web page 1600 (S1511), upon clicking on the "OK" button in the setting Web page 1600, the setting contents (setting information) in the setting Web page is sent to the NAS manager 706 (S1512). The NAS manager 706 receives the setting contents via a function such as CGI (Common Gateway Interface) (S1513), and stores the setting contents received in the memory 113, shared memory 120, shared LU 310, and the like (S1514). The stored information about the assignment of LUs to the channel controllers 110 is referred to by the OS and application program as needed, and is used in restricting individually access to the LUs from the channel controllers 1 to 8 (110). For example, the channel controllers 1 to 4 (110), which have received a data input/output request from an information processing apparatus 200, each examine, with referring to the setting contents, whether the data input/output request is targeted at the logical volume assigned to the respective channel controllers, and when the request is assigned to them, the channel controller 1 to 4 (110) performs processing concerning the data input/output request, and when the request is not assigned to them, they do not.

As also shown in FIG. 16, the user of the information processing apparatus 200 can confirm information about all capacity, usage amounts in real time, access frequencies (numbers of access per hour) in real time, and the like of the LUs by use of the setting Web page 1600. The user, etc., of the information processing apparatus 200 refers to the setting Web page 1600 to understand the states of the LUs that the storage system 600 comprises and to be able to optimally assign the LUs to the channel controllers 110 without wasting any.

In this way, in the storage system 600 of the present embodiment, the assignment to the channel controllers 110 can be done from the information processing apparatus 200 by use of the setting Web page 1600. Therefore, the user, etc., of the information processing apparatus 200 can easily assign and manage the LUs according to the user's own needs. Note that the setting and control described above can also be performed from the managing terminal 160.

Restrictions on Access to Channel Controllers

Figure 17:
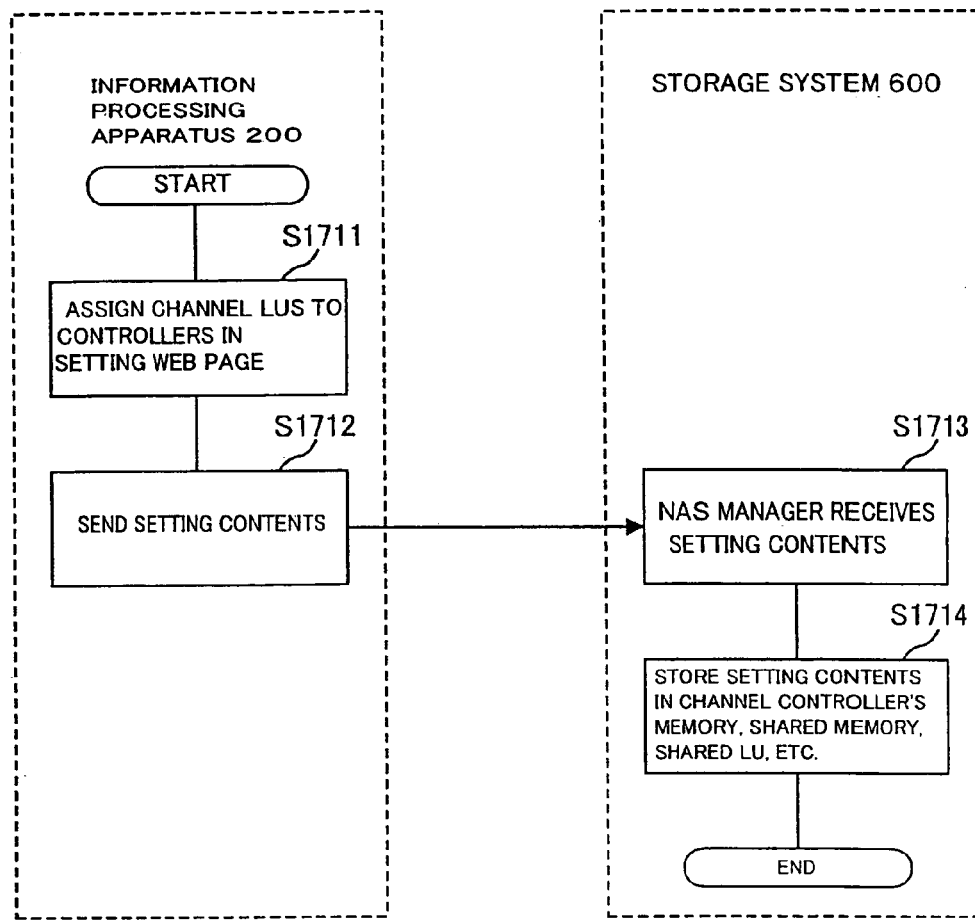
FIG. 17 is a flow chart explaining the process of setting restrictions on access to the channel controllers by use of the setting Web page according to the present embodiment.

Restrictions on access can be set such that only specific information processing apparatuses 200 can access the channel controllers 1 to 4 (110). This setting can be performed from an information processing apparatus 200 as well by use of a setting Web page. FIG. 17 is a flow chart for explaining the processing performed by the information processing apparatus 200 and the storage system 600.

Figure 18:
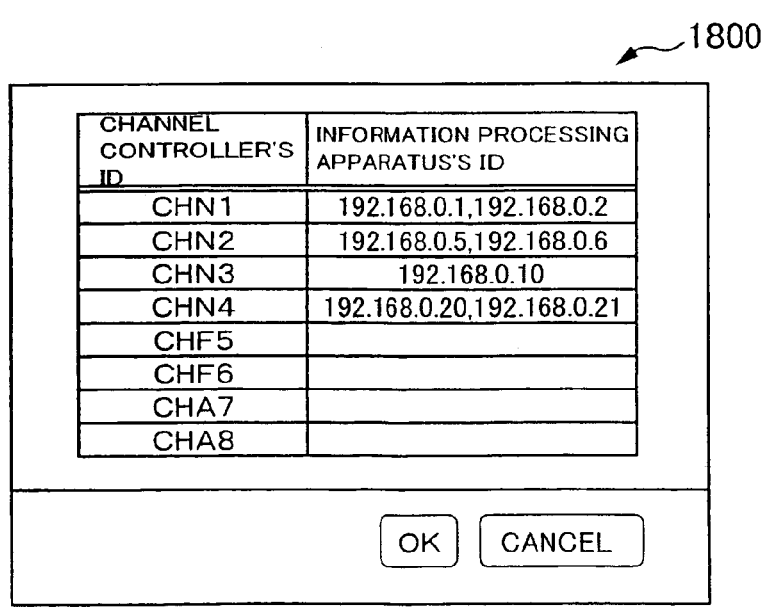
FIG. 18 shows the setting Web page used in setting restrictions on access to the channel controllers according to the present embodiment.

FIG. 18 is a setting Web page 1800 used in setting restrictions on access from the information processing apparatuses 200 to the channel controllers 1 to 4 (110). A content of a "channel controller ID" column in this page is automatically created by attaching a unit to be a hardware of the channel controller to a corresponding slot. By setting the identifiers of information processing apparatuses 200 in an "information processing apparatus ID" column on the right of that column, information processing apparatuses 200, which are allowed to access the channel controllers 1 to 4 (110), can be designated. The IDs of information processing apparatuses 200 are, for example, network addresses such as IP addresses. Note that, although not shown, the IDs of the information processing apparatuses 200 are divided into groups, and in terms of the groups as units, information processing apparatuses 200, which are allowed to access the channel controllers 1 to 4 (110), can also be designated for the individual channel controllers 1 to 4 (110).

After the setting in this setting Web page 1800 (S1711), when clicking on the "OK" button in the setting Web page 1800, the setting contents (setting information) in the setting Web page 1800 is sent to the NAS manager 706 (S1712). The NAS manager 706 receives the setting contents via a function such as CGI (Common Gateway Interface) (S1713), and stores the received setting contents in the memory 113, shared memory 120, shared LU 310, and the like (S1714). The stored information about the assignment of the LUs to the channel controllers 110 is referred to by the OS and application program as needed, and is used in restricting access to a channel controllers 110 from the information processing apparatuses 200 which is not allowed to access the channel controller 110.

By restricting access to the channel controllers 1 to 4 (110) in this way, it becomes possible to assign information processing apparatuses 200 to the channel controllers 1 to 4 (110) such that processing load is evenly distributed, for example, from the point of view of users of the information processing apparatuses 200, and the storage system 600 can be efficiently operated by use of this function. Note that the setting and control described above can also be performed from the managing terminal 160.

Replication Managing Function

A replication managing function is a function that stores the copy of data stored in an LU (hereinafter, called "to-be-copied" LU) in another LU (hereinafter, called "to-be-copied-into" LU), and is implemented by a replication managing program 760, which is stored in NVRAM 144, being executed by the CPU 142 of the disk controller 140.

Figure 19:
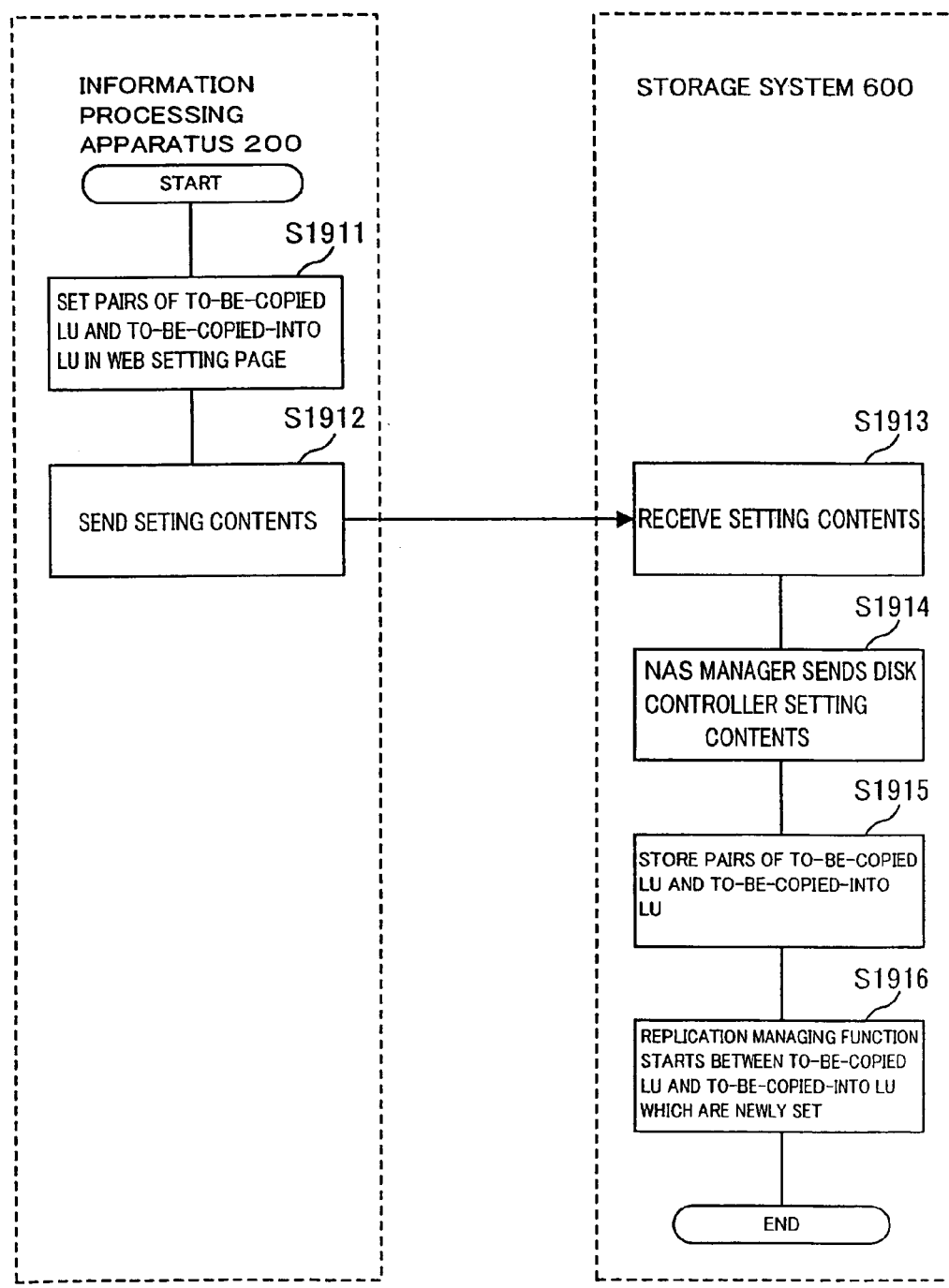
FIG. 19 is a flow chart explaining the process associated with a replication management function according to the present embodiment.

FIG. 19 is a flow chart for explaining the processing associated with the replication managing function. The correspondence between to-be-copied LUs and to-be-copied-into LUs can be set by the information processing apparatus 200 by use of a setting Web page provided by the NAS manager 706. FIG. 20 shows an example of the setting Web page used in setting the correspondence (pairing) between to-be-copied LUs in which data is stored and to-be-copied-into LUs in which a copy of the data is stored. In setting the correspondence, after setting the LUN to be a to-be-copied LU in the to-be-copied LU column of this setting Web page 2000 and setting the LUN of a to-be-copied-into LU in the to-be-copied-into LU column on the right thereof (S1911), the user clicks on the "OK" button in the setting Web page 2000, and thereby the setting contents in the setting Web page 2000 is sent to the NAS manager 706 from the information processing apparatus 200 (S1912). The NAS manager 706 receives the setting contents (S1913), and then sends the setting contents to a disk controller 140 (S1914). When the disk controller 140 receives the setting contents, it stores the contents in the NVRAM 144 (S1915). The replication managing program 760 executes a replication managing function according to the relationship between the to-be-copied LUs and the to-be-copied-into LUs stored in the NVRAM 144. After the above processing, the replication managing function starts to work on between the to-be-copied LU and the to-be-copied-into LU which are newly set (S1916).

Note that according to instructions from the managing terminal 160 or the NAS manager 706, the control state of the to-be-copied LU and the to-be-copied-into LU can change into a "pair state" (where the replication managing function is executing) and a "split state" (where the replication managing function is halted). As to the relationship between the to-be-copied LU and the to-be-copied-into LU in the "pair state", when the contents in the to-be-copied LU is updated, the contents in the to-be-copied-into LU is also immediately updated.

Specifically, in the "pair state", the identity of contents is secured in real time between the to-be-copied LU and the to-be-copied-into LU. As to the relationship between the to-be-copied LU and the to-be-copied-into LU in the "split state", even when the contents in the to-be-copied LU is updated, the contents in the to-be-copied-into LU does not immediately reflect it, and when the "split state" changes into the "pair state" again, the to-be-copied-into LU is made to reflect the contents in the to-be-copied LU which has been written during the "split state". Note that during the "split state", data of the differences between the contents in the to-be-copied LU and the contents in the to-be-copied-into LU are managed by the replication managing function. Such data of the differences are managed for, e.g., each block or track as an area managing unit set on the memory area of the LU.

Figure 22:
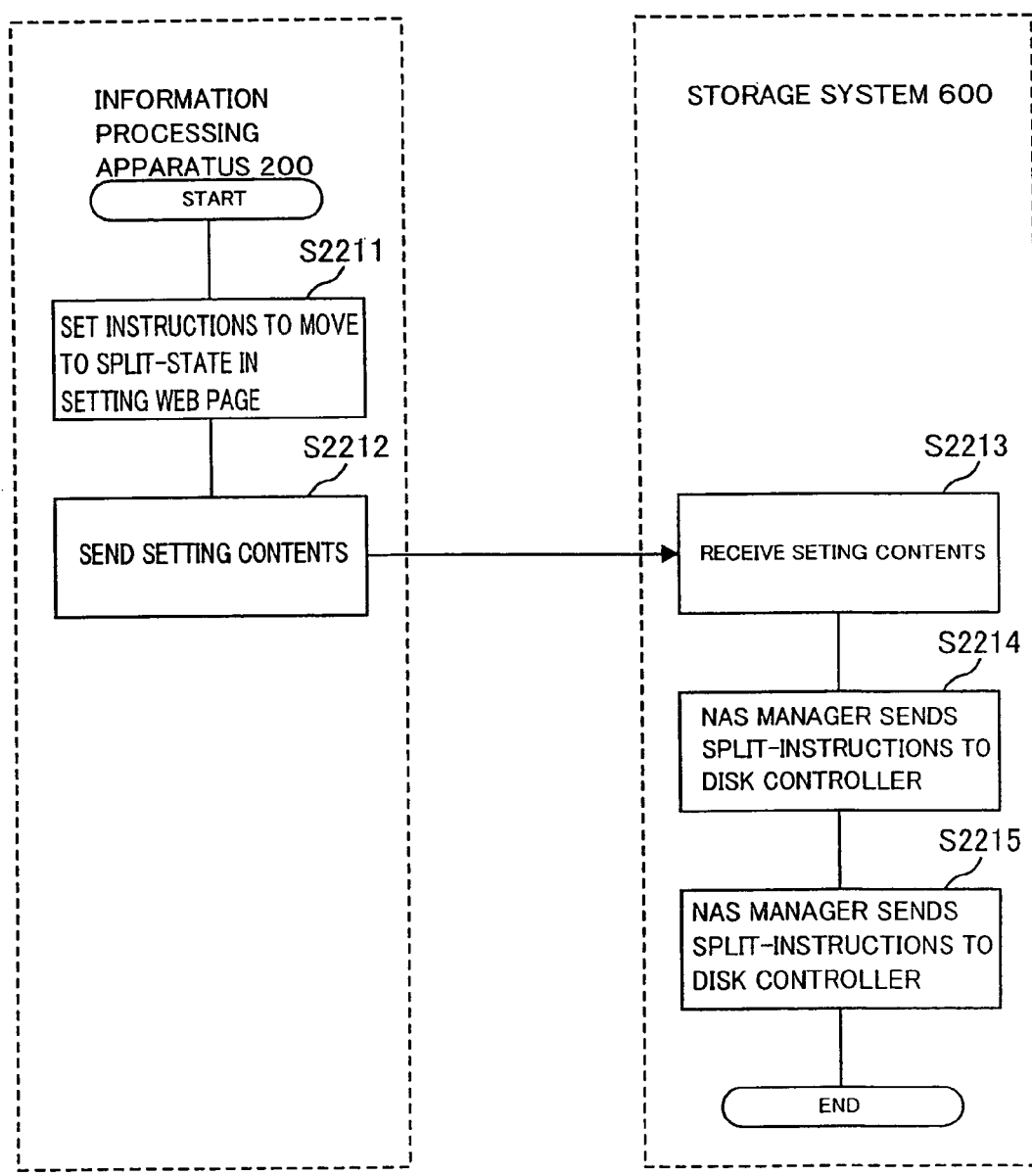
FIG. 22 is a flow chart explaining the process associated with the change from the "pair state" to the "split state", according to the present embodiment.

FIG. 21 shows an example of the setting Web page used in instructing the change from the "pair state" to the "split state". In this setting Web page 2100, the change can be set for each pair of to-be-copied LU and to-be-copied-into LU. The processing associated with the change from the "pair state" to the "split state" will be described with reference to the flow chart of FIG. 22. In instructing the change into the "split state" (where the replication managing function is halted) for a pair of to-be-copied LU and to-be-copied-into LU, "execution" is entered in a split column of the setting Web page 2100 (S2211). After that, when the user clicks on the "OK" button in the setting Web page 2100, a notice is sent to the NAS manager 706 from the information processing apparatus 200 (S2212). Then the NAS manager 706, which has received the notice (S2213), sends the disk controller 140 a command to instruct to change into the "split state" (hereinafter, called "split instructions") for the pair of to-be-copied LU and to-be-copied-into LU for which the change into the "split state" is specified (S2214). When the replication managing program 760 which operates on the disk controller 140 receives the command, the replication managing program 760 changes from the "pair state" to the "split state" for the pair of to-be-copied LU and to-be-copied-into LU (S2215).

Note that by the change from the "pair state" to the "split state", the contents of the to-be-copied-into LU at the time of changing into the "split state" is kept. The "split instructions" is sent, for example, when data is backed up. Specifically, by backing up the contents of the to-be-copied-into LU in the "split state", the backup data can be acquired without affecting the to-be-copied LU. Further, the "split instructions" are also sent when the user wants to access the contents of the to-be-copied LU at a point of time in the past. That is, the user can access the contents of the to-be-copied LU at some point in time in the past because the contents of the to-be-copied-into LU are kept to be the contents at the time of changing into the "split state". Note that the "split instructions" sent for this purpose may be called "snap shot instructions", and the contents kept in the to-be-copied LU at some point in time in the past may be called "snap shot image". By backing up snap shot images at a plurality of points in time as needed, the contents of the to-be-copied LU can be managed in generations.

When the backup is completed, or snap shot images need not be kept, the state changes from the "split state" to the "pair state". This change can be instructed from the information processing apparatus 200 by use of the setting Web page of FIG. 23. The processing in this case will be described with reference to the flow chart of FIG. 24. In instructing the change into the "pair state" (resuming of the replication managing function) for a pair of to-be-copied LU and to-be-copied-into LU, "execution" is entered in a re-sync column of the setting Web page 2300 (S2411). Then, when the user clicks on the "OK" button, a notice is sent to the NAS manager 706 from the information processing apparatus 200 (S2412). Then the NAS manager 706, which has received the notice (S2413), sends the disk controller 140 a command to instruct it to change into the "pair state" (hereinafter called "re-sync instructions") for the pair of to-be-copied LU and to-be-copied-into LU (S2414). When the disk controller 140 receives the command, the replication managing program 760 operating on the disk controller 140 makes the contents of the to-be-copied LU coincide with the contents of the to-be-copied-into LU by use of the managed data of the differences (S2415). After the contents of the to-be-copied LU coincide with the contents of the to-be-copied-into LU, the replication managing program 760 makes the to-be-copied LU and the to-be-copied-into LU go into the "pair state" (S2416).

Figure 25:
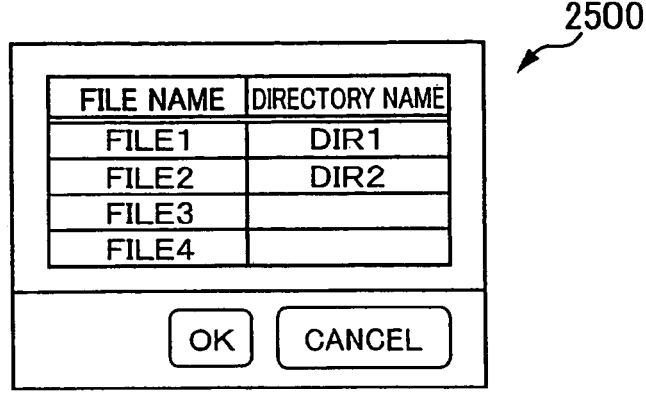
FIG. 25 shows the setting Web page used in selecting for individual files and directories whether the replication management function is applied thereto, according to the present embodiment.
Figure 26:
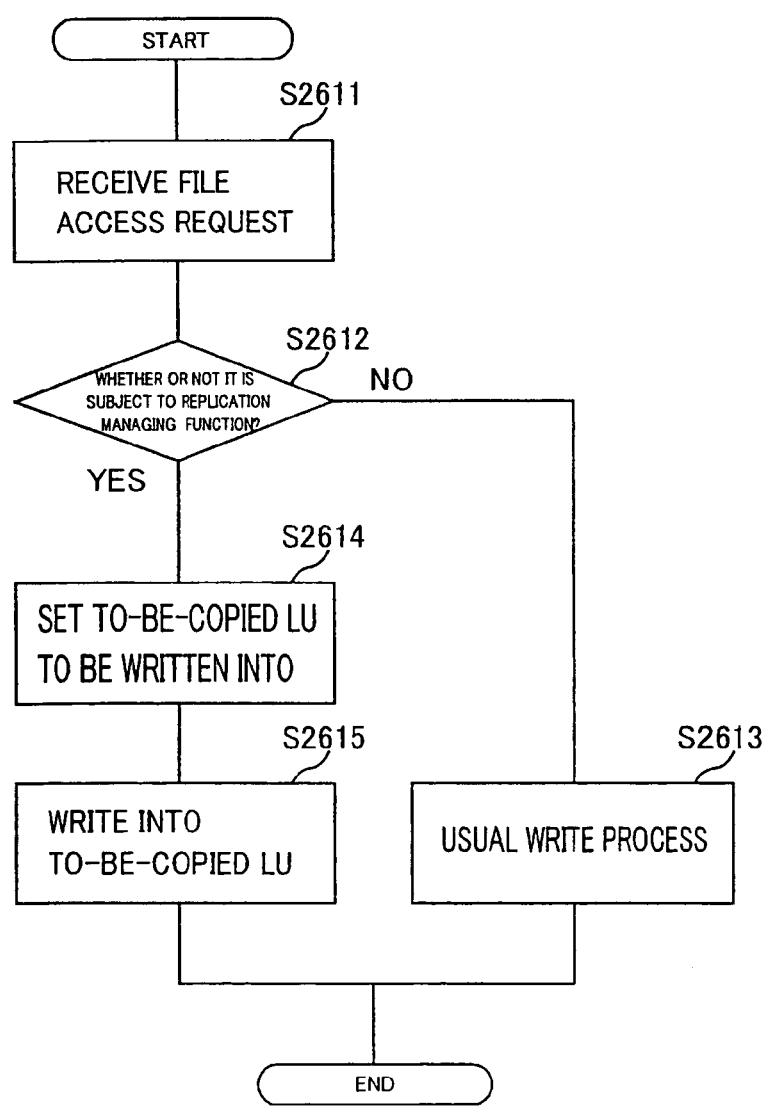
FIG. 26 is a flow chart explaining the process of selecting for individual files and directories whether the replication management function is applied thereto, according to the present embodiment.

Whether the replication managing function is applied may be chosen for individual files or directories. Files and directories set to be objects, to which the replication managing function is applied, have their copies stored or created automatically in the respective to-be-copied-into LUs. FIG. 25 shows an example of the setting Web page used in choosing whether the replication managing function is applied for individual files or directories. In this setting Web page 2500, the names of files and directories, to which the replication managing function is to be applied, can be specified. By clicking on the "OK" button, the contents set in the setting Web page 2500 is sent to the NAS manager 706. Then the NAS manager 706 stores the setting contents in the shared memory 120. The contents of the shared memory 120 are referenced by the file system program 703, for example, when the storage system 600 has received a file access request to access a file or directory set to be objects, to which the replication managing function is applied by the information processing apparatus. This processing performed by the file system program 703 in this case will be described with reference to the flow chart of FIG. 26.

When the storage system 600 has received a file access request (S2611), the file system program 703 references the contents of the shared memory 120 to examine whether or not the file or directory specified in the file access request is subject to the replication managing function (S2612). If it is not subject to the replication managing function (S2612: NO), a usual writing processing is executed (S2613). On the other hand, if it is subject to the replication managing function (S2612: YES), the metadata 730 is set such that the area where the write data is to be written into is in the memory area of the LU designated as the to-be-copied LU by the replication managing function (S2614). Therefore, the file subject to the replication managing function is stored in the to-be-copied LU, and a copy of the file subject to the replication managing function and the metadata 730 is automatically stored in the to-be-copied-into LU (S2615). Since the metadata 730 is automatically stored in the to-be-copied-into LU by the replication managing function, data stored in the to-be-copied-into LU can also be managed by the file system program 703.

Figures 27, 28:
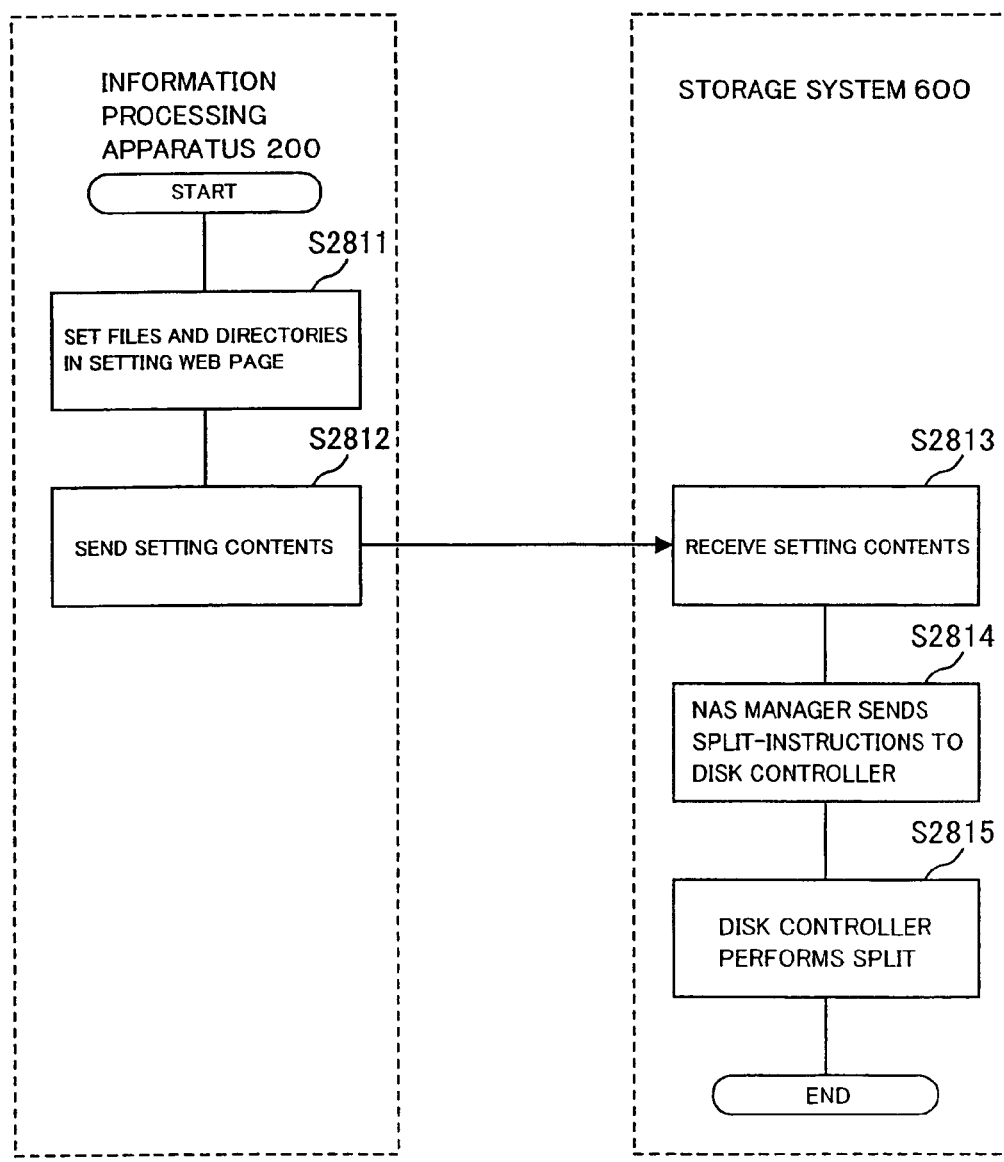
FIG. 27 shows the setting Web page used in creating a snap shot image for individual files and directories, according to the present embodiment.
FIG. 28 is a flow chart explaining the process of creating a snap shot image for individual files and directories, according to the present embodiment.

A snap shot image can be created for individual files or directories. FIG. 27 shows an example of the setting Web page used in creating a snap shot image for individual files or directories. In this setting Web page 2700, files and directories for which a snap shot image is created, and the date and time when the snap shot is to be executed can be specified. FIG. 28 is a flow chart for explaining the process of creating a snap shot image for individual files and directories. After files and directories are set in the setting Web page 2700 (S2811), upon clicking on the "OK" button, the contents set in the setting Web page 2700 is sent to the NAS manager 706 (S2812). When the NAS manager 706 receives the setting contents (S2813), it sends the disk controller 140 "split instructions" for pairs of a to-be-copied LU where a file or directory specified in the setting contents is stored and a to-be-copied-into LU where a copy thereof is stored (S2814). When the replication managing program 760 of the disk controller 140 receives "split instructions", it performs split to resolve the pairs (S2815). Accordingly, snap shot images of files and directories specified in the setting contents are kept in the to-be-copied-into LUs. Because snap shot images not only for individual LUs but also for individual files and directories can be created in this way, detailed services can be provided.

Securing of Consistency

Figure 29:
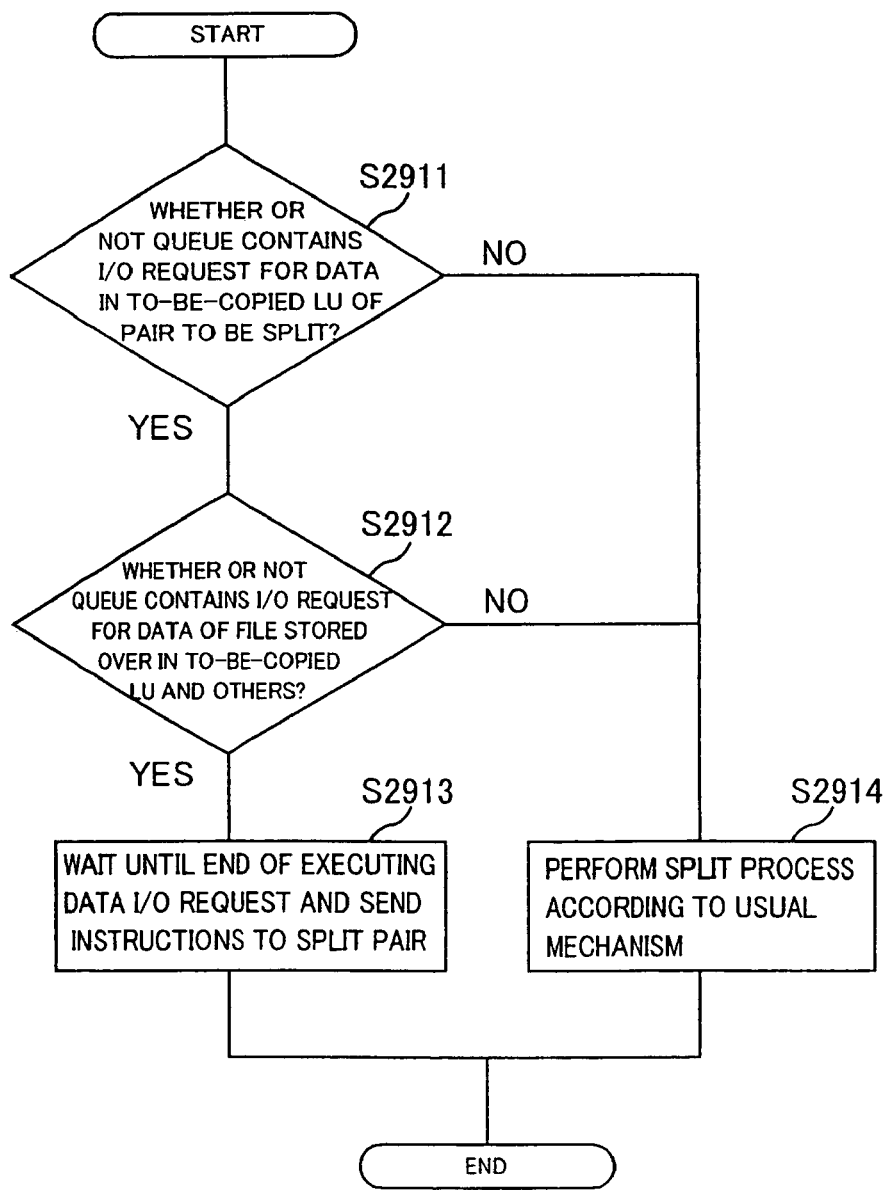
FIG. 29 is a flow chart explaining a mechanism to ensure consistency of the whole data of a file, according to the present embodiment.

For the reason, for example, that data size is enormous or the like, data of a file (hereinafter called "file data") may be stored over in a plurality of LUs. Here, while such file data is being written into a storage device 300, if the relationship between a to-be-copied LU into which the data is being written and a to-be-copied-into LU forming a pair therewith goes into the "split state", the consistency of the whole file data in the to-be-copied-into LU will not be ensured. Therefore, the storage system 600 of the present embodiment is provided with a mechanism that ensures the consistency of the whole file data even in such a case. This mechanism will be specifically described with reference to the flow chart of FIG. 29.

When the NAS manager 706 is going to send "split instructions" for a pair of a to-be-copied LU and a to-be-copied-into LU, it checks whether the data I/O request queue for the storage device 300 managed by the OS 701 contains a data I/O request to access the to-be-copied LU of the pair (S2911). If such a data I/O request is contained (S2911: YES), it further checks whether the data I/O request queue contains a data I/O request to access a file that is stored (or to be stored) over the to-be-copied LUs as well as the pair's (S2912). If such a data I/O request is contained (S2912: YES), the NAS manager 706 waits until processing of the data I/O request is finished, and sends "split instructions" for the pair. (S2913) to the replication managing program 760. Thus, the consistency of the whole file data is ensured in the to-be-copied-into LUs as well. Note that if (S2911: NO) or (S2912: NO), processing associated with the split is performed by use of the above-mentioned usual mechanism (S2914).

Note that in writing or reading into or from the storage device 300 according to a data I/O request, all to-be-copied LUs are not necessarily written or read into or from at the same time. Hence, not waiting until the whole processing of the data I/O request is finished, it may send "split instructions" when the completion of processing for the pair to be split is confirmed.

As described above, since the setting and control of the replication managing function by the information processing apparatus 200 by use of the setting Web page can be performed, flexible operation of the replication managing function from the point of view of a user of the information processing apparatus 200 is possible. Further, since the setting and control of the replication managing function can be performed not only for individual LUs but also for individual files and directories, services for a user of the information processing apparatus 200 can be improved. Note that the setting and control described above can be arranged to be performed from the managing terminal 160.

Remote Copy

As to the above-mentioned remote copy function (replication) implemented by CPU 142 of the disk controller 140 executing software stored in NVRAM 144, the setting and control thereof can also be performed by use of the setting Web page provided by the NAS manager 706. While the remote copy function is running, upon writing data into a to-be-copied LU (hereinafter called "primary LU") in the storage system 600, the data is sent from the storage system 600 to a system 610 serving as another storage system via SAN 500, and written into an LU (hereinafter called "secondary LU") of the storage system 610 as well. In this way, during the run of the remote copy function, the contents of the primary LU and the secondary LU are controlled to coincide with each other.

The methods of remote copy include a synchronous method and an asynchronous method. In the case of the synchronous method, when receiving a data input/output request for the writing of data into a primary LU from the information processing apparatus 200, the storage system 600 writes the data associated with the data input/output request into the primary LU, and sends the same data as the data written to the storage system 610. When receiving the data sent from the storage system 600, the storage system 610 writes the data into the secondary LU, and notifies the storage system 600 to the effect that the data has been written. And the storage system 600 that received the above notification sends the message to the information processing apparatus 200 to the effect that data write operation is completed.

As described above, in the case of the synchronous method, the information processing apparatus 200 is not notified of the completion until it is confirmed that the data has been written into both the primary LU and the secondary LU. Therefore, the consistency between the contents of the primary LU and the contents of the secondary LU is secured when the information processing apparatus 200 receives the completion notice. Note that in the case of the synchronous method, the information processing apparatus 200 is not notified of the completion until the data has been written into the secondary LU.

Hence, in the case of the synchronous method, the response time from an information processing apparatus 200, to access the storage system 600, sending the storage system 600 a data input/output request to the completion notice being returned to the information processing apparatus 200 is usually longer than in the case of the asynchronous method.

In the case of the asynchronous method, the storage system 600 having received a data input/output request to write data into a primary LU from an information processing apparatus 200 writes the data into the primary LU according to the request, and sends the same data as the data written to the storage system 610. When receiving the data sent from the storage system 600, the storage system 610 writes the data into the secondary LU, and notifies the storage system 600 to the effect that the data has been written. Here, the storage system 600 notifies the information processing apparatus 200 of the completion associated with the above data input/output request regardless of whether or not the data has been written into the storage system 610. Hence, In the case of the asynchronous method, the time of response to the information processing apparatus 200 is usually shorter than in the case of the synchronous method. Note that the consistency in data between the primary LU and the secondary LU is not necessarily ensured even when the information processing apparatus 200 receives the completion notice unlike in the synchronous method. Note that when the remote copy is applied, the storage system 600 usually manages information about the differences in the contents between the primary LU and the secondary LU.

Figure 30:
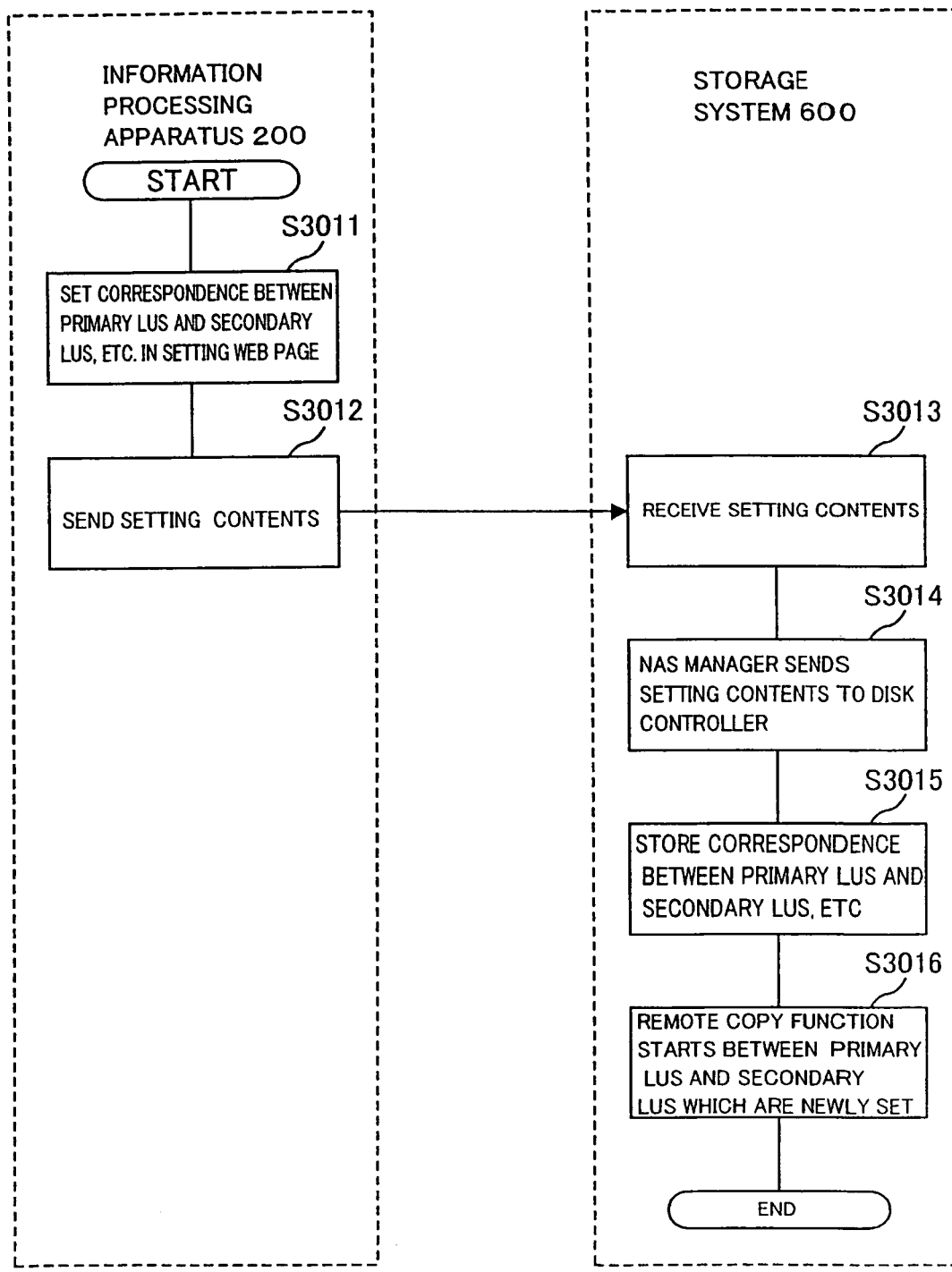
FIG. 30 is a flow chart explaining the process associated with the setting of correspondence between primary LUs and secondary LUs for a remote copy function, according to the present embodiment.

The setting associated with the remote copy function such as the correspondence, described above, between a primary LU and a secondary LU, and the selection between the synchronous method and the asynchronous method can be performed from the information processing apparatus 200 by use of a setting Web page provided by the NAS manager 706. The processing associated with the setting of the remote copy function will be described with reference to the flow chart shown in FIG. 30. FIG. 31 shows an example of the setting Web page 3100 used in this setting. In setting the correspondence between a primary LU and a secondary LU, the LUN of a primary LU is entered in a primary LU column of the setting Web page 3100, and the LUN of a secondary LU is entered in a secondary LU column on the right thereof. By putting a check on a check column on the right thereof, the selection between this remote copy pair to be operated according to the synchronous method or the asynchronous method can be made (S3011). When clicking on the "OK" button, the contents set in the setting Web page 3100 is sent to the NAS manager 706 from the information processing apparatus 200 (S3012).

When the NAS manager 706 receives the setting contents (S3013), it sends the contents to the disk controller 140 (S3014). When receiving these setting contents, the disk controller 140 stores the correspondence between the primary LU and the secondary LU and, for this pair, the selection of which method of remote copy is used, which are among the contents, in the memory 143 according to the setting contents (S3015).

The remote copy control program 750 executes remote copy according to the relationship between the primary LU and the secondary LU and the selection of the remote copy method stored in the memory 143. Therefore, after the above process, the control starts in such a way that the contents of the primary LU newly designated are stored in the secondary LU as well (S3016). In addition, this control is performed according to the remote copy method selected.

Figure 33:
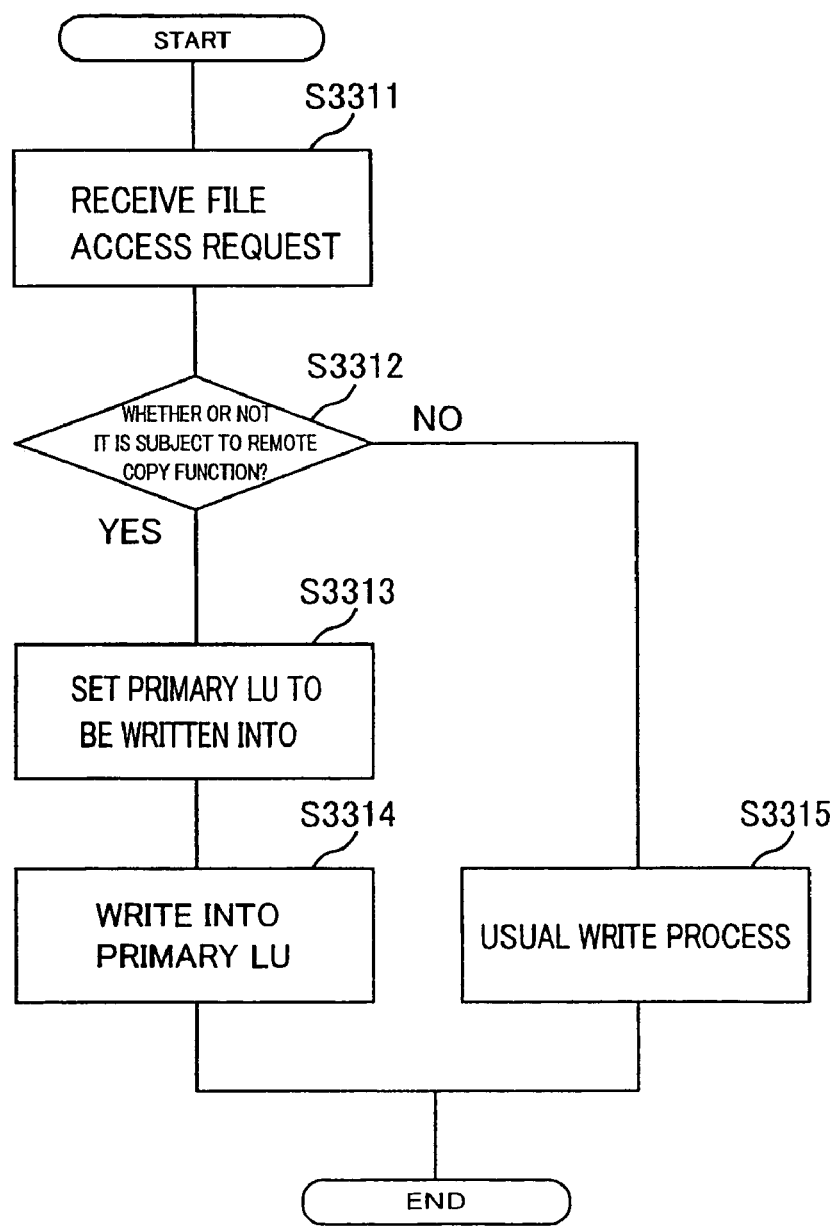
FIG. 33 is a flow chart explaining the process performed upon receiving a request to access a file, to which the remote copy function is set to be applied, according to the present embodiment.

It can also be chosen for individual files and directories whether or not the remote copy function is applied. In this case, files and directories to which the remote copy function is set to be applied are automatically stored or created in a primary LU. FIG. 32 shows an example of the setting Web page used in choosing for individual files and directories whether or not the remote copy function is applied. A file name to apply the remote copy function is entered in a "file name" column of the setting Web page 3200, and a directory name to apply the remote copy function is specified in a "directory name" column of the setting Web page 3200. When clicking on the "OK" button, the contents set in the setting Web page 3200 is sent to the NAS manager 706. When receiving the setting contents, the NAS manager 706 stores the contents in the memory 113. The contents stored in the memory 113 in this way is referenced by the file system program 703 when the storage system 600 receives from a information processing apparatus 200 a file access request to access a file or directory to which the remote copy function is set to be applied. The processing of the file system program 703 will be described with reference to the flow chart of FIG. 33.

When the storage system 600 receives a file access request (S3311), the file system program 703 references the contents of the memory 143 to examine whether or not the remote copy function is set to be applied to the file or directory specified in the file access request (S3312). When the file or directory is subject to the remote copy function (S3312: YES), the metadata 730 is set such that the area where the write data is to be written into is in the memory area of the LU designated as the primary LU by the remote copy function (S3313). Thereby, the file subject to the remote copy function is stored in the primary LU (S3314), and a copy of the file subject to the remote copy function and the metadata 730 is automatically stored in the secondary LU. In the case of (S3312: NO), a usual write processing is executed (S3315). In addition, by the remote copy function, the metadata 730 is automatically stored in the secondary LU as well. Therefore the file system can recognize data stored in the secondary LU as a file.

In the storage system 600 described above, the setting and control associated with the remote copy function can be performed from the information processing apparatus 200 by use of the setting Web page provided by the NAS manager 706. The flexible operation of the remote copy function from the point of view of a user of the information processing apparatus 200 is possible, so that services are improved. In addition, the setting and control described above can be arranged to be performed from a managing terminal 160.

Backup

The storage system 600 comprises a function to back up and restore data in a storage device by a backup device 900 connected to SAN 500 or a backup device 910 connected to LAN 400 according to instructions from a setting Web page. This function, different from a backup performed by the above-mentioned backup server, is provided as a function of the storage system 600. In this backup, in terms of files, LUs, virtualized logical volumes, etc., data to be backed up can be designated.

Figures 34, 35:
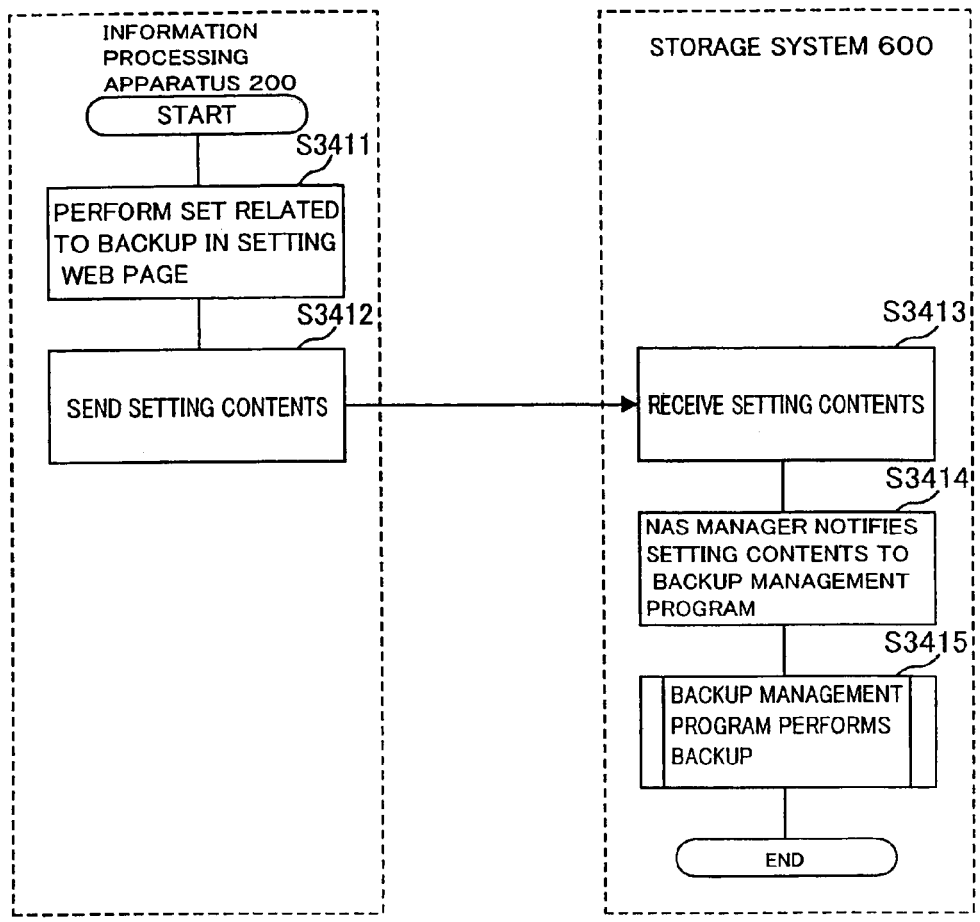
FIG. 34 is a flow chart explaining the process of acquiring a backup by use of the setting Web page according to the present embodiment.
FIG. 35 shows the setting Web page used in performing the setting and control associated with the backup, according to the present embodiment.

The setting and control associated with the backup can be performed by use of a setting Web page. The processing in acquiring a backup by use of a setting Web page will be described with reference to the flow chart shown in FIG. 34. FIG. 35 shows an example of the setting Web page used in performing the setting and control associated with the backup. In designating data to be backed up in terms of files, the name of a file or directory to be backed up is entered in a "file name" column of the setting Web page 3500; in designating in terms of LUs, the LUN, an identifier, of an LU to be backed up is entered in a "LUN" column, and in designating in terms of virtualized logical volumes, the ID of a virtualized logical volume is entered in a "virtualized logical volume" column. A date-and-hour to acquire a backup is specified in a schedule column. A plurality of date-and-hours can be specified. Further, it can be set to be periodically performed, so that generation management is also possible. In a "data transmission method" column, whether or not the data is backed up in the backup device 900 via SAN 500 or in the backup device 910 via LAN 400 is selected (S3411).

Figure 36:
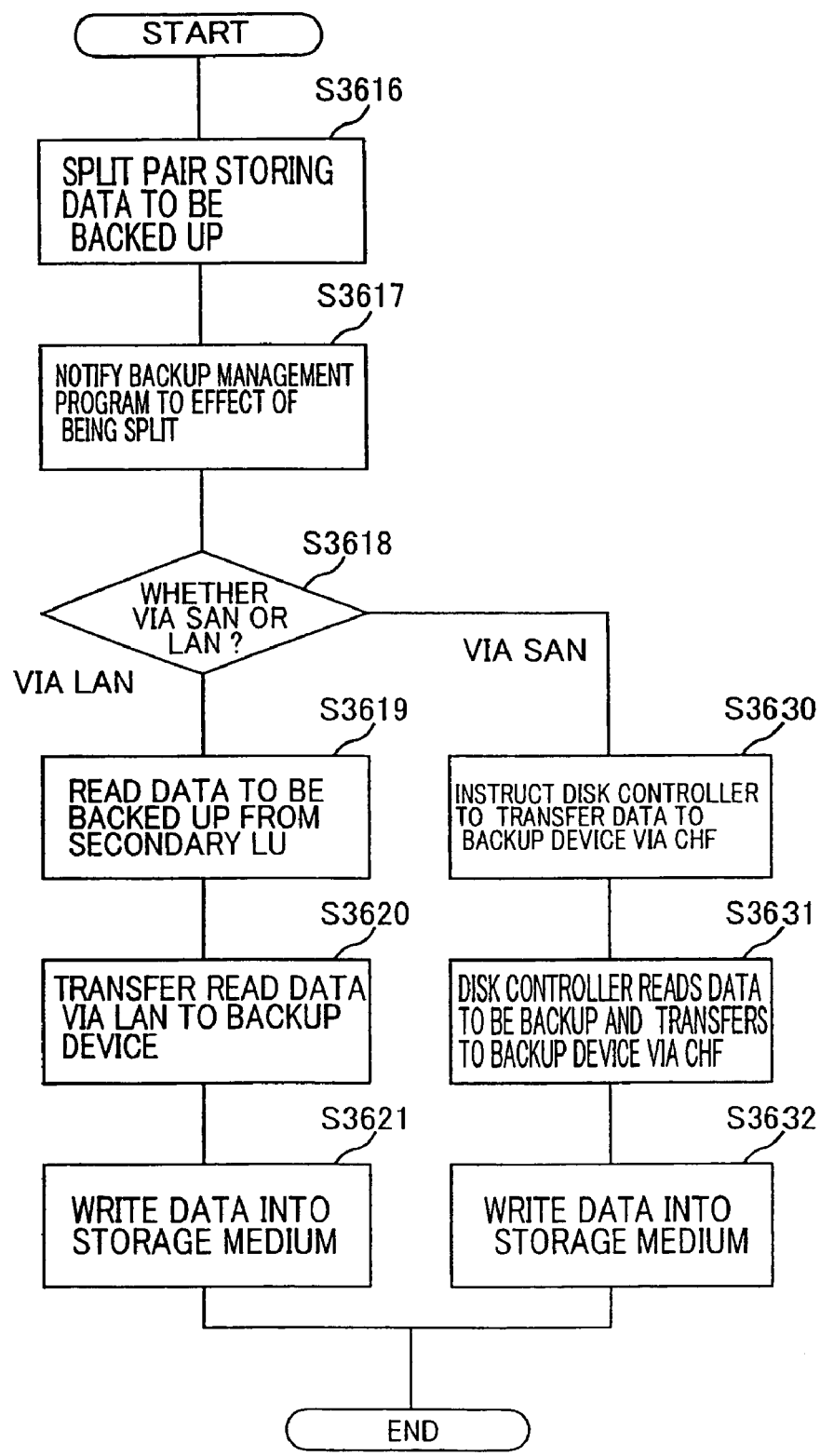
FIG. 36 is a flow chart explaining the process associated with the backup, according to the present embodiment.

The contents (setting information) set by a user in the setting Web page 3500 is sent to the NAS manager 706 when clicking on the "OK" button (S3412). When receiving the setting contents sent (S3413), the NAS manager 706 notifies the backup management program 710 of the setting contents received (S3414). The backup management program 710 performs backup according to the setting contents notified (S3415). Backup is performed in cooperation with the above replication managing function according to the flow chart shown in FIG. 36.

First, the backup management program 710, via the replication managing program 760, gets a pair of a primary LU and a secondary LU, which store data to be backed up, to go into a "split state" (S3616). When the pair goes into the "split state", the disk controller 140 notifies the backup management program 710 to that effect (S3617). The backup management program 710 having received the notice examines whether via-LAN 400 is selected or via-SAN 500 is selected as the transmission method (S3618: YES). Here, when via-LAN 400 is selected, it sends a request to read to-be-backed-up data stored in the secondary LU to the disk controller 140. When receiving the read request, the disk controller 140 reads the to-be-backed-up data from the secondary LU (S3619). Here, if to-be-backed-up data is specified in terms of file name or directory name, data specified by metadata corresponding to the above file name and directory name is read from the storage device 300. If specified in terms of LUN or volume ID, data is read from the LU corresponding to the LUN or the LUs forming the virtualized logical volume corresponding to the volume ID.

Next, the backup management program 710 transfers the data to be backed up read in this way via LAN 500 to the backup device 910 (S3620). Accordingly, the to-be-backed-up data is written into a storage medium set in the backup device 910 (S3621).

On the other hand, when via-SAN 500 is selected as the data transmission method, backup is performed in the following manner. First, the backup management program 710 sends the disk controller 140 a command to the effect that it instructs to transfer to-be-backed-up data stored in the secondary LU via CHF 5, 6 (110) to the backup device 900. By this, the disk controller 140 reads the to-be-backed-up data, and transfers the data via CHF 5, 6 (110) to the backup device 900 (S3631). Then the data to be backed up is written into a storage medium set in the backup device 900 (S3632). Thus, the backup is completed.

According to the storage system 600 described above, the setting and control associated with the backup can be performed from the information processing apparatus 200 by use of a setting Web page. The flexible operation of the backup from the point of view of a user of the information processing apparatus 200 is possible. Further, the setting and control described above can be arranged to be performed from the managing terminal 160.

Restore

Figure 37:
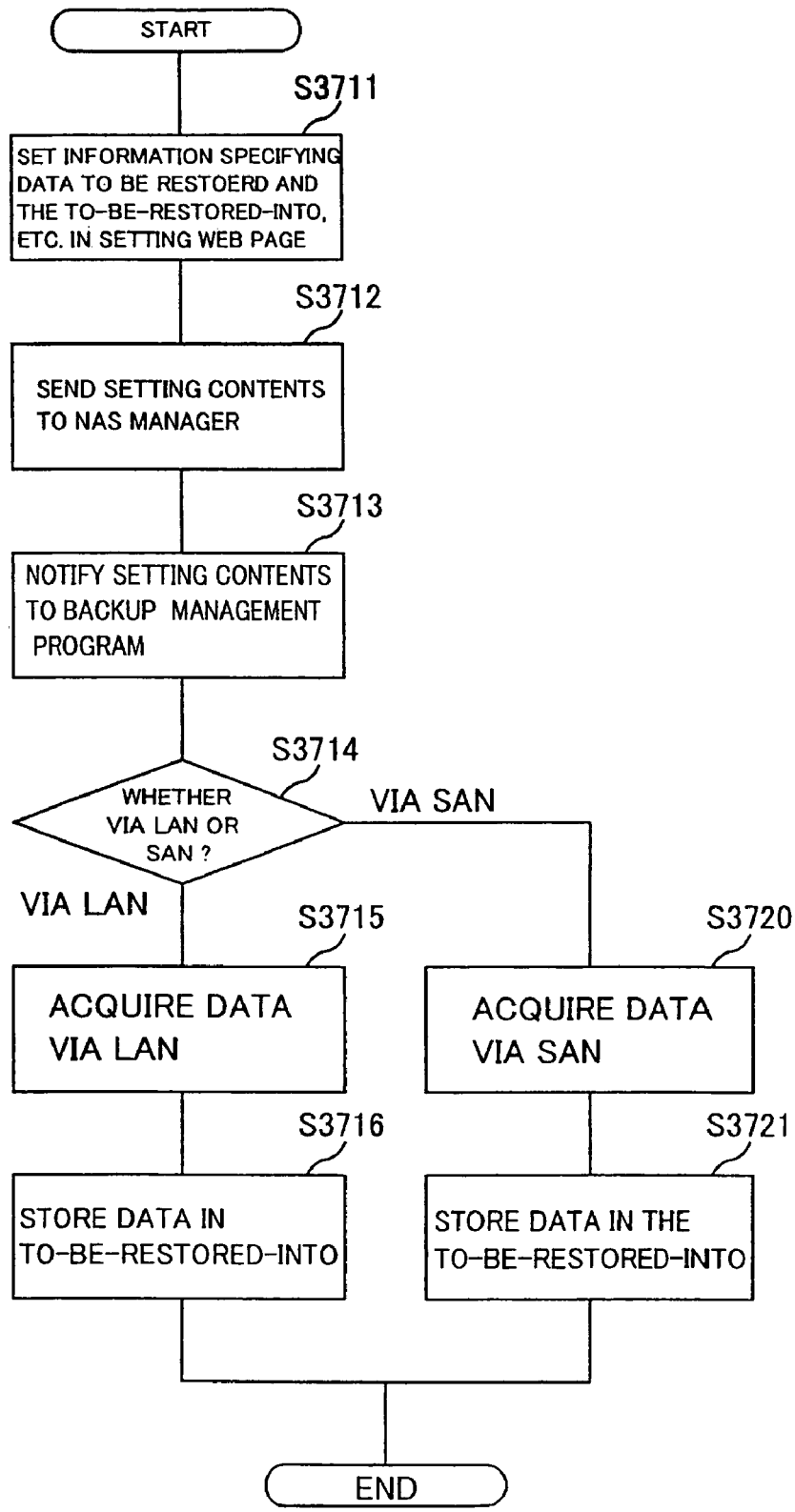
FIG. 37 is a flow chart explaining the process associated with restoration, according to the present embodiment.

Data backed up in the storage medium can be restored into the storage device 300 by instructing from a setting Web page. The processing in restoring via a setting Web page will be described with reference to the flow chart of FIG. 37.

Figure 38:
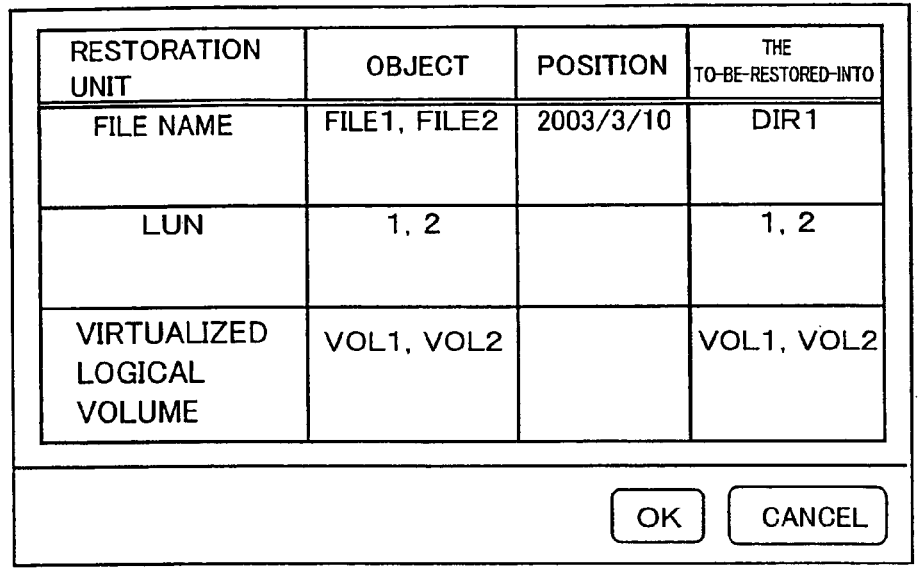
FIG. 38 shows the setting Web page used in performing the setting and control associated with the restoration, according to the present embodiment.

FIG. 38 shows a setting Web page used in performing the setting and control associated with the restoration. An user, etc., of the information processing apparatus 200 sets in an "object" column of the setting Web page 3800 a file name or directory name, LUN, and volume ID of a virtualized logical volume as information identifying data to be restored, and specifies the to-be-restored into for data restored in a "to-be-restored into" column. The to-be-restored-into can be specified in directory, LUN, or virtualized logical volume. After the setting Web page 3800 has been set (S3711), the setting contents (setting information) in the setting Web page 3800 is sent to the NAS manager 706 when clicking on the "OK" button provided in the setting Web page 3800 (S3712).

The NAS manager 706 notifies the backup management program 710 of the setting contents received (S3713). The backup management program 710 having received the notification checks whether data to be restored is stored in the backup device 910 connected to LAN 400 or in the backup device connected to SAN 500 (S3714). Here, when the data to be restored is stored in the backup device 910 connected to LAN 400 (S3714: via-LAN), the backup management program 710 obtains the data to be restored from the backup device 910 via LAN 400 (S3715), and stores the data in a location specified as the to-be-restored-into (S3716).

On the other hand, when the to-be-restored data is stored in the backup device 900 connected to SAN 500 (S3714: via-SAN), the backup management program 710 obtains the to-be-restored data from the backup device 900 via a CHF and SAN 500 (S3720), and stores it in a location specified as the to-be-restored-into (S3721). In the above way, the restoration is performed.

According to the storage system 600 described above, the setting and control associated with the restoration can be performed from the information processing apparatus 200 by use of the setting Web page. The flexible operation of the restoration from the point of view of a user of the information processing apparatus 200 is possible. In addition, the setting and control described above can be arranged to be performed from the managing terminal 160.

Management of Software

Figure 39:
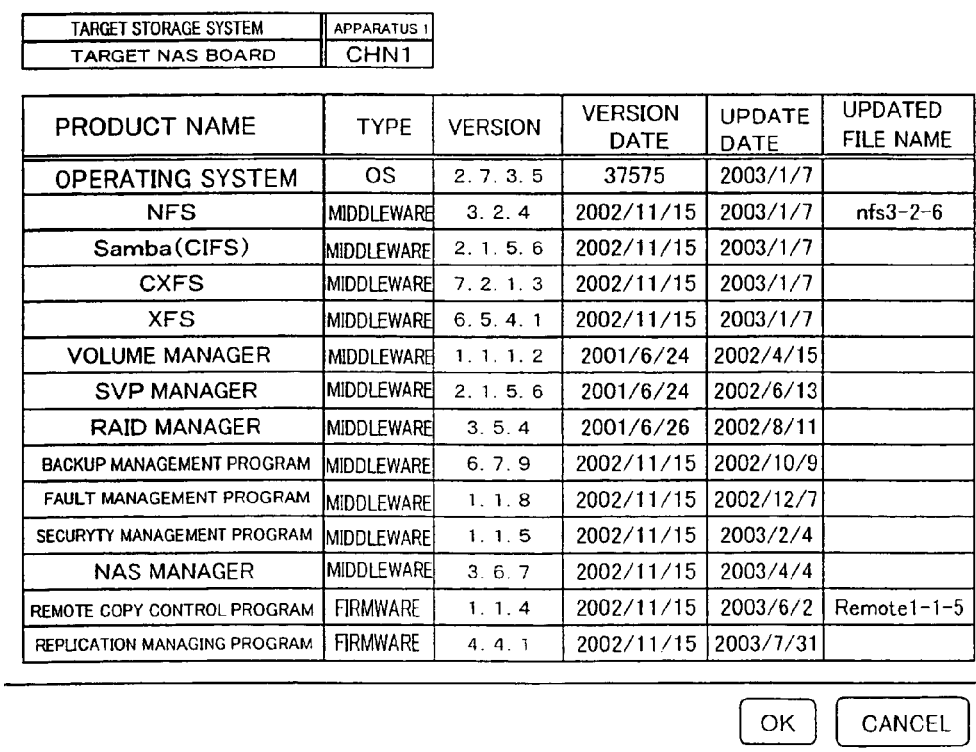
FIG. 39 shows the setting Web page used in version-up of the software, according to the present embodiment.

Software implementing various functions of the storage system 600 such as OS 701 executed by the channel controller 1 to 4 (110) of the storage system 600, application programs installed to operate under the OS 701, and pieces of firmware stored in NVRAM's 115, 144 of the channel controller 110 and of disk controller 140 can be upgraded in version via the setting Web page. FIG. 39 shows an example of the setting Web page used at that time. The setting Web page 3900 displays for each product name a type, version, version date, update date, etc., of the piece of software. By confirming these versions, a user, operator, etc., of the information processing apparatus 200 can confirm the update states of the pieces of software.

Figure 40:
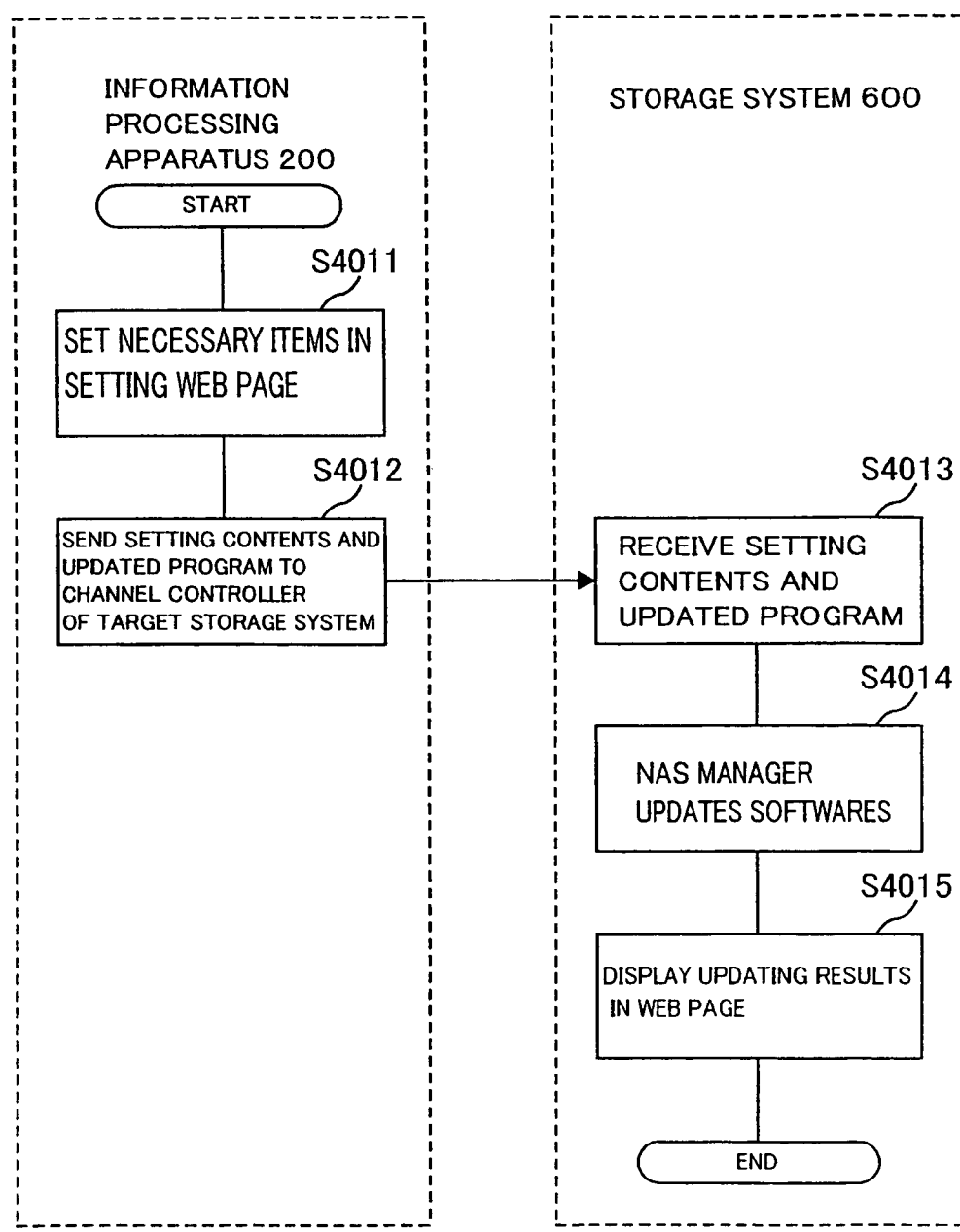
FIG. 40 is a flow chart explaining the process associated with version-up of the software by use of the setting Web page, according to the present embodiment.

Software can be upgraded in version by use of a setting Web page 3900. The processing associated with version-upgrade of software by use of the setting Web page 3900 will be described with reference to the flow chart shown in FIG. 40. In version-upgrade, first, an upgraded program (data for updating) is stored in the disk of an information processing apparatus. 200. The upgraded program may be taken in by the information processing apparatus 200 via a storage medium such as CD-ROM or downloaded via a network. The ID of a storage system whose software is to be upgraded is specified in a "target storage system" column in the setting Web page 3900. In this way, from one information processing apparatus 200, the software for each storage system 600 can be upgraded. Further, the ID of the channel controller 1 to 4 (110) at which the software is targeted is set in a target NAS board column. Since a channel controller 110 subject to the software upgrade can be specified, software can be upgraded for a plurality of channel controllers 110 from an information processing apparatus 200 for example. In an "update file name" column the file name of an updated program stored beforehand in the information processing apparatus 200 is set. In this figure, IDs given to OS 701 and applications can be specified. In a "file name" column the file name of an updated program stored beforehand in a disk is specified.

After the above setting (S4011), when clicking on the "OK" button, the contents set in the setting Web page 3900 and the updated program are sent to the channel controller 110 (S4012). When the NAS manager 706 running on the targeted at channel controller 110 receives the updated program (S4013), the software stored in a storage device 300 is updated by the updated program (S4014). When the to-be-updated software is firmware, a program that executes the update of firmware starts to update firmware stored in NVRAM's 115, 144 of the channel controller 110 and disk controller 140. After the software is updated, the NAS manager 706 provides a setting Web page, in which the update results are described, to the information processing apparatus 200 (S4015).

According to the storage system 600 described above, the software can be easily managed from the information processing apparatus 200 by use of the setting Web page. In addition, the setting and control described above can be arranged to be performed from the managing terminal 160.

Cluster Management

As described above, the fault management program 705 in the storage system 600 performs fail-over control between channel controllers 110 constituting a cluster.

The cluster setting is so performed that same types of channel controllers (circuit boards) 110 attached to the storage device controlling apparatus 100 are divided into respective groups (into clusters) according to the type. By this, when a fault occurs in a channel controller 110 in a group (cluster), another channel controller 110 in the cluster is controlled to take over the processing of the channel controller 110, where the fault has occurred and which is under proceeding until then.

The storage system 600 comprises two systems of power supply to improve reliability. Each slot of the storage device controlling apparatus 100 is connected to one of the two systems of power supply. In setting a cluster, the cluster is arranged to include both channel controllers 110 connected respectively to the two systems of power supply. That is, the cluster is so arranged that all channel controllers 110 therein are not connected to only the same system of power supply. By this, since, if a power supply system stops supplying power due to a fault therein with the other operating normally, the other power supply system continues to supply to another channel controller 110 connected to the same power system in the same cluster. Therefore, fail over is enabled onto the other channel controller 110.

Figure 41:
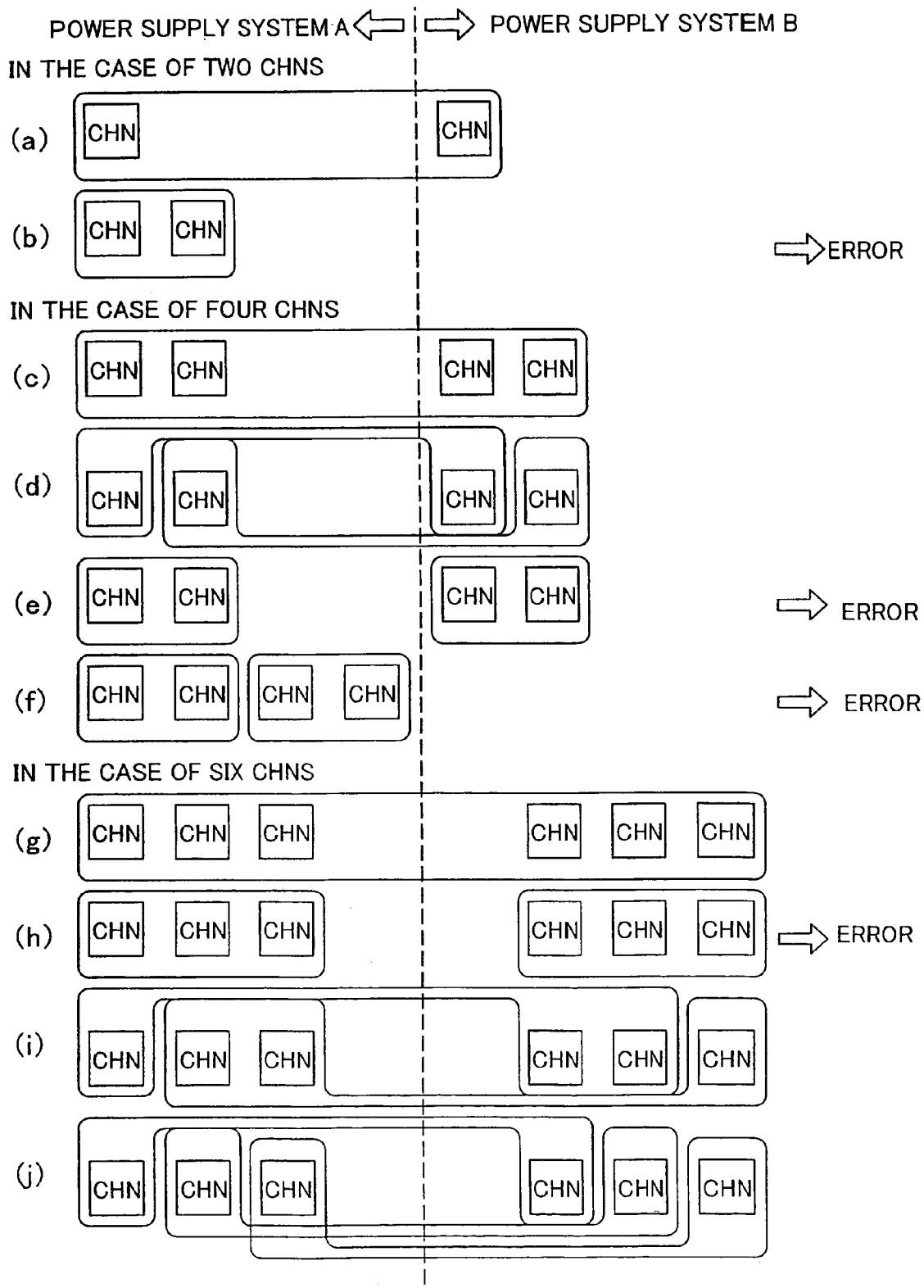
FIG. 41 is a view explaining ways that clusters are set such that each cluster includes channel controllers connected to two systems of power supply, respectively, according to the present invention.
Figure 42:
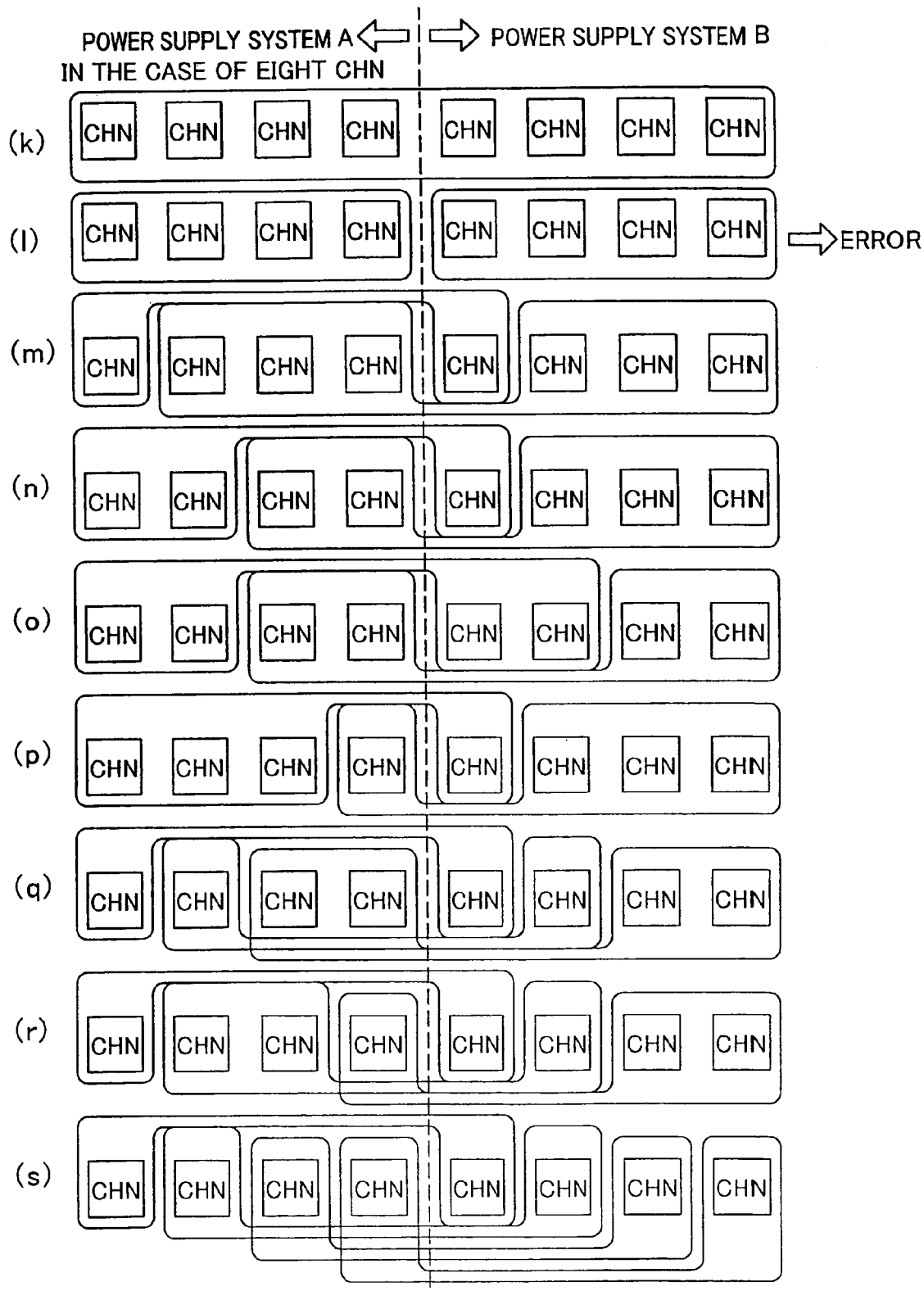
FIG. 42 is a view explaining ways that clusters are set such that each cluster includes channel controllers 110 connected to two systems of power supply, respectively, according to the present invention.

Ways that clusters are so set that each cluster includes channel controllers 110 connected to the two systems of power supply respectively are shown in FIGS. 41 and 42. The storage device controlling apparatus 100 comprises eight slots, and there is no restriction on to which slot which channel controller 110 is attached. It is also possible that CHFs 110, CHAs 110, and CHNS 110 together are attached thereto. FIGS. 41 and 42 show an example of the setting of the cluster where only CHNs 110 are attached. FIG. 41 shows examples where two CHNs 110 are attached, where four CHNs 110 are attached, and where six CHNs 110 are attached. As shown in FIG. 41, because the power sources of the CHN 110 constituting the cluster are the same system, the combinations (b), (e), (f), and (h) cause an error. FIG. 42 shows examples where eight CHNs 110 are attached.

Because the power sources of the CHN 110 forming the cluster are the same system, the combination (1) causes an error.

Figure 43:
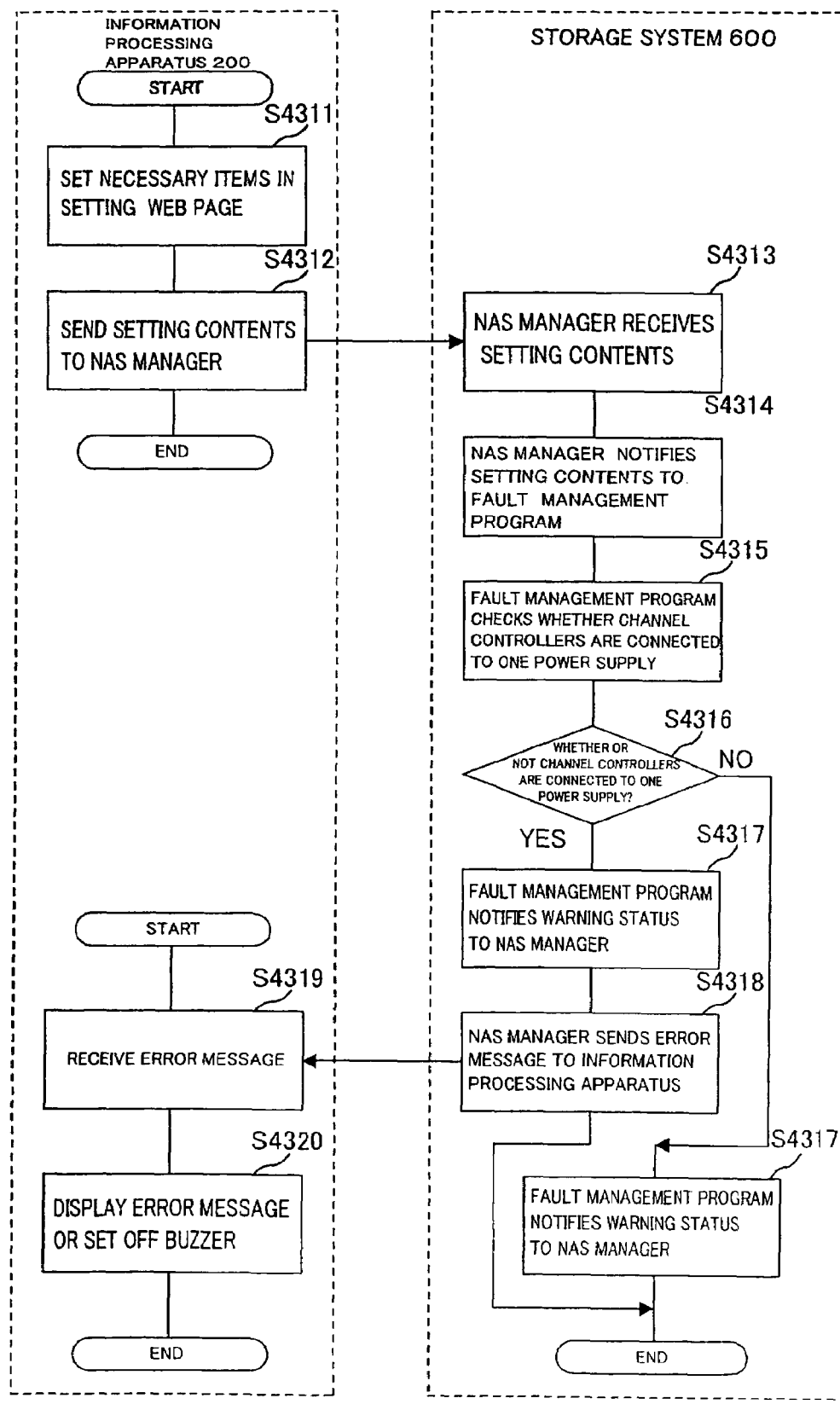
FIG. 43 is a flow chart explaining the process associated with cluster setting, according to the present embodiment.
Figure 44:
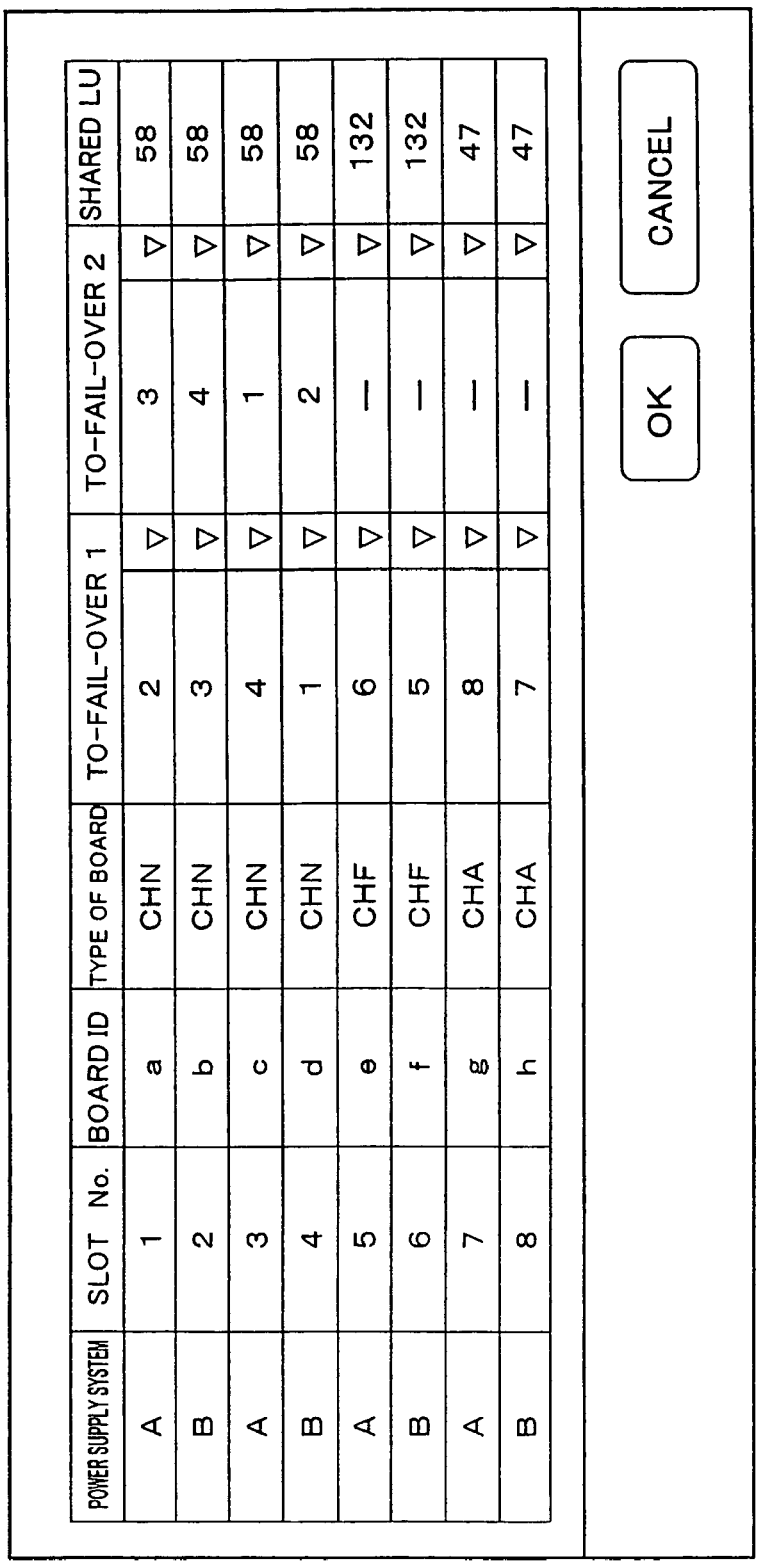
FIG. 44 shows a setting Web page used in cluster setting, according to the present embodiment.

The setting of clusters can be performed via a setting Web page. The processing associated with the setting of clusters will be described with reference to the flow chart of FIG. 43. FIG. 44 shows an example of the setting Web page displayed in the information processing apparatus 200 for setting clusters.

The setting Web page 4400 of FIG. 44 for setting clusters has a power supply system column, a slot number column, a board ID column, a board type column, a column 1 for setting the to-fail-over, a column 2 for setting the to-fail-over, and a shared LU setting column. The power supply system column shows which power supply system for each slot. In the setting Web page 4400, odd-numbered slots are connected to power supply system A, and even-numbered slots are connected to power supply system B.

The board ID column shows the board ID of the channel controller 110 attached to each slot, the board ID being for example a production number or IP address. The board type column shows the type of the channel controller 110 attached to each slot. CHN, CHA, or CHF are listed as the type. The column 1 for setting the to-fail-over is a setting column for designating another board for fail over the processing when a fault has occurred in the board. These designations can be selected by clicking with a mouse on portions indicated by downward triangle marks. The column 2 for setting the to-fail-over is a setting column for designating yet another board to fail over the processing when the board designated in the column 1 for setting the to-fail-over cannot. These designations can also be selected by clicking with a mouse on portions indicated by downward triangle marks. The shared LU setting column is a setting column for designating LUs accessible from and shared among the channel controllers 110 constituting the cluster. The shared LUs stores take-over information, etc., needed in fail-over processing.

After the necessary settings are set in the setting Web page 4400 (S4311), when clicking on the "OK" button provided on the Web page, the setting contents in the setting Web page 4400 are sent to the NAS manager 706 of the storage system 600 from the information processing apparatus 200 (S4312). When the NAS manager 706 receives the setting contents (S4313), it notifies the fault management program 705 of the setting contents received (S4314). The fault management program 705 checks the setting contents whether or not the channel controllers 110 constituting each cluster are connected solely to a power supply system, A or B (S4315).

If connected solely to power supply system A or B (S4316: YES), the fault management program 705 notifies a warning status to the NAS manager 706 (S4317). The NAS manager 706, with the notice of this status, sends an error message to the information processing apparatus 200 for example by providing a Web page to that effect or by use of SNMP (Simple Network Management Protocol) (S4318). When the information processing apparatus 200 receives this error message (S4319), a buzzer is set off if provided therewith. Alternatively, the display unit provided in the information processing apparatus 200 displays an error message (S4320).

On the other hand, when the channel controllers 110 constituting the cluster are connected to both power systems A and B, this setting information is stored in the memory 113 of each channel controller 110 and the shared LU (S4321).

This completes the setting of the clusters. In addition, this setting information can be arranged to be stored in a storage area for cluster information of the system LU and a cluster LU as well.

Figure 45:
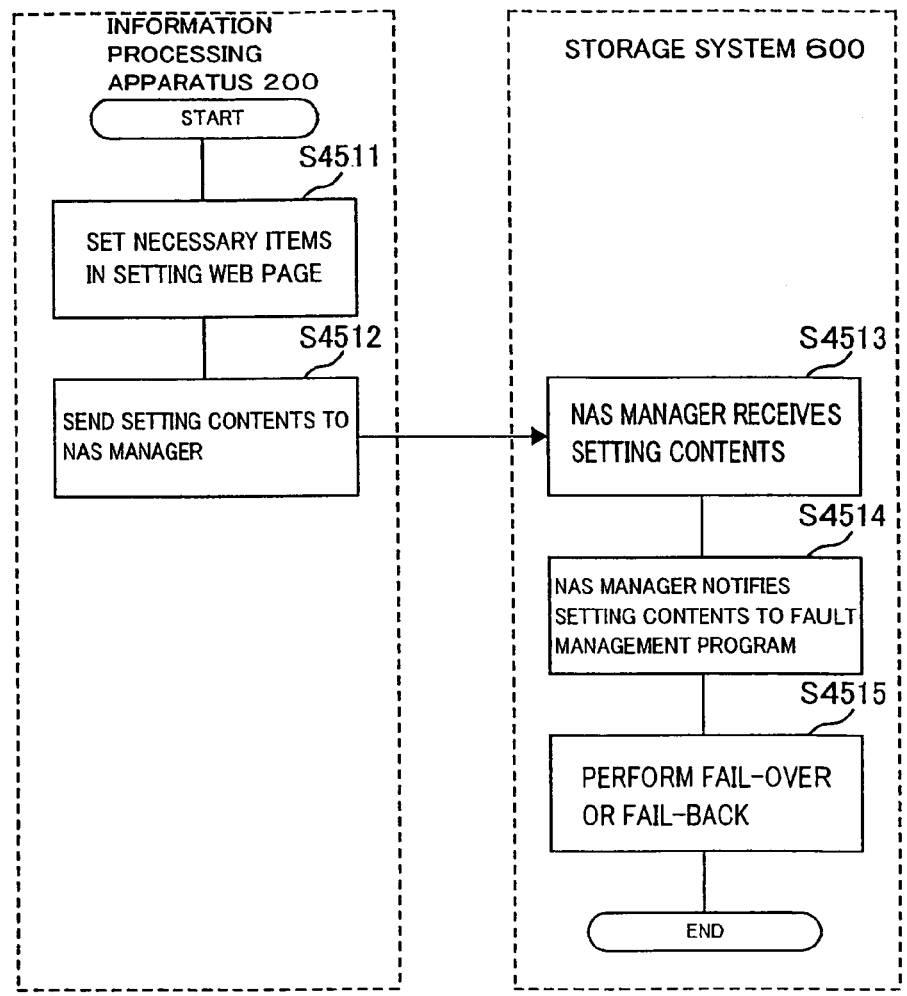
FIG. 45 is a flow chart explaining the process of controlling fail-over or fail-back via the setting Web page, according to the present embodiment.
Figure 46:
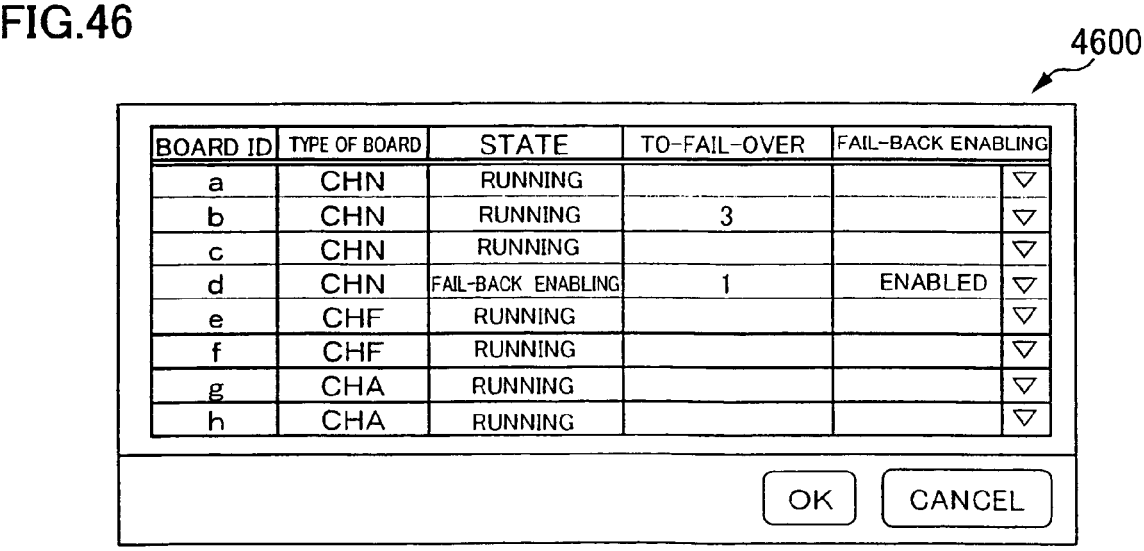
FIG. 46 shows the setting Web page used in controlling fail-over or fail-back, according to the present embodiment.

The control of fail-over and fail-back can be performed via a setting Web page. The processing in the control of fail-over and fail-back will be described with reference to the flow chart of FIG. 45. FIG. 46 shows an example of the setting Web page displayed in the information processing apparatus 200.

The setting Web page 4600 is provided with a board ID column, a board type column, a state displaying column, a column for setting the to-fail-over, and a fail-back enabling column. The state displaying column displays automatically which state the board is currently in. In the column for setting the to-fail-over, the board ID of the to-fail-over is specified if enabling fail-over. For a board already failed over, the board ID of the failing-over is displayed automatically.

If enabling fail-over, the board ID required to be failed over is specified in the column for setting the to-fail-over. The board ID of the to-fail-over can be selected by clicking with a mouse on portions indicated by downward triangle marks. A board selectable is a board belonging to the same cluster as the board required to be failed over does. If enabling fail-back, "execution" is put in the fail-back enabling column. This can be done by clicking with a mouse on portions indicated by downward triangle marks.

After the setting in the setting Web page 4600 (S4511), when clicking on the "OK" button provided therein, the setting contents in the setting Web page are sent to the NAS manager 706 (S4512). When the NAS manager 706 receives the setting contents (S4513), it notifies the fault management program 705 of the contents (S4514). The fault management program 705 performs the processing associated with the fail-over and fail-back according to the setting contents (S4515).

Because, as described above, the setting and control of the fail-over and fail-back are performed from the information processing apparatus 200 by use of the setting Web page 4600, the flexible operation of these functions from the point of view of a user of the information processing apparatus 200 is possible, so that services for a user of the information processing apparatus 200 are improved. In addition, the setting and control of clusters described above can be arranged to be performed from the managing terminal 160.

In the storage system 600 according to the present embodiment, as described above, the setting of a cluster is performed such that the channel controllers 110 are not connected solely to one power supply system. Accordingly, since, if a power supply system stops supplying power due to a fault therein, the other power supply system continues to supply to another channel controller 110 in the same cluster, the storage system 600 can be provided, which is high in applicability.

Although the preferred embodiment of the present invention has been described in detail, it should be understood that various changes, substitutions and alterations can be made therein without departing from the spirit and scope of the invention as defined by the appended claims.

What is claimed is:

1. A method of controlling a storage device controlling apparatus which includes:
   a plurality of channel controllers each having a circuit board on which are formed a file access processing section receiving requests to input and output data in files as units from an information processing apparatus via a network and an I/O processor outputting to a storage device I/O requests corresponding to said requests to input and output data; and
   a disk controller executing input and output of data into and from said storage device in response to the I/O requests sent from said I/O processors, and managing a memory area provided by said storage device in logical volumes, which are memory areas logically set on the memory area,
   said method comprising:
   receiving, by at least one of said channel controllers, data specifying an assignment of a logical volume to said channel controller, said data being sent from said information processing apparatus; and
   storing said received assignment by said at least one channel controller.

2. A method of controlling a storage device controlling apparatus according to claim 1, wherein when receiving one of said data input and output requests, each of said at least one channel controller checks based on said stored assignment whether or not the data input/output request is targeted at a logical volume assigned to said channel controller, and if not targeted thereat, the data input/output request is not executed.

3. A method of controlling a storage device controlling apparatus which includes:
   a plurality of channel controllers each having a circuit board on which are formed a file access processing section receiving requests to input and output data in files as units from an information processing apparatus via a network and an I/O processor outputting to a storage device I/O requests corresponding to said requests to input and output data; and
   a disk controller executing input and output of data into and from said storage device in response to the I/O requests sent from said I/O processors, and managing a memory area provided by said storage device in logical volumes, which are memory areas logically set on the memory area, said method comprising:
   performing, when data is written into a first logical volume, by said disk controller a replication management process by which said data is also written into a second logical volume in order to store a copy of the data in a second logical volume;
   receiving, by each of at least one of said channel controllers, correspondence between a first logical volume and a second logical volume where a copy of the first logical volume is stored, which correspondence is sent from said information processing apparatus, and notifying it to said disk controller; and
   performing by said disk controller said replication management process according to said notified correspondence.

4. A method of controlling a storage device controlling apparatus which includes:
   a plurality of channel controllers each having a circuit board on which are formed a file access processing section receiving requests to input and output data in files as units from an information processing apparatus via a network and an I/O processor outputting to a storage device I/O requests corresponding to said requests to input and output data; and
   a disk controller executing input and output of data into and from said storage device in response to the I/O requests sent from said I/O processors, and managing a memory area provided by said storage device in logical volumes, which are memory areas logically set on the memory area, said method comprising:

performing, when data is written into a first logical volume, by said disk controller a remote replication management process by which said data is sent to a second logical volume provided by another storage device controlling apparatus in order to store a copy of the data in a second logical volume in said another storage device controlling apparatus;

receiving, by each of at least one of said channel controllers, correspondence between a first logical volume and a second logical volume where a copy of the first logical volume is stored, which correspondence is sent from said information processing apparatus, and notifying it to said disk controller; and performing, by said disk controller, said remote replication management process according to said notified correspondence.

5. A method of controlling a storage device controlling apparatus which includes:

a plurality of channel controllers each having a circuit board on which are formed a file access processing section receiving requests to input and output data in files as units from an information processing apparatus via a network and an I/O processor outputting to a storage device I/O requests corresponding to said requests to input and output data; and a disk controller executing input and output of data into and from said storage device in response to the I/O requests sent from said I/O processors; said method comprising:

receiving, by each of at least one of said channel controllers, setting information about backup of data stored in said storage device from said information processing apparatus; and reading to-be-backed-up data stored in said storage device based on said setting information and sending the data to a backup device coupled to said network.

6. A method of controlling a storage device controlling apparatus according to claim 5, wherein in setting information, to-be-backed-up data is specified in files or directories as units.

7. A method of controlling a storage device controlling apparatus which includes:

a plurality of channel controllers each having a circuit board on which are formed a file access processing section receiving requests to input and output data in files as units from an information processing apparatus via a network and an I/O processor outputting to a storage device I/O requests corresponding to said requests to input and output data; and a disk controller executing input and output of data into and from said storage device in response to the I/O requests sent from said I/O processor, said method being for updating a program read from said storage device and executed by hardware formed on said circuit board, said method comprising:

receiving, by each of at least one of said channel controllers, data for updating said program and sent from said information processing apparatus; and updating, by said controlling apparatus, said program stored in said storage device according to the data for updating the program;

wherein said program includes a program associated with an operating system, a program associated with a file system, and a management program.

8. A method of controlling a storage device controlling apparatus according to claim 7, wherein at least one of said channel controllers has a function as a Web server, and wherein data for updating one of said program is sent to said at least one channel controller by use of a Web page function provided to said information processing apparatus via said network.

9. A method of controlling a storage device controlling apparatus according to claim 7, wherein said program is at least one of a program for enabling an operating system executed by hardware formed on said circuit board to function and an application program operating on the operating system.

10. A method of controlling a storage device controlling apparatus which includes:

a plurality of channel controllers each implemented by, as components, a circuit board on which are formed a file access processing section receiving requests to input and output data in files as units from an information processing apparatus via a network and an I/O processor outputting to a storage device I/O requests corresponding to said requests to input and output data; and a disk controller executing input and output of data into and from said storage device in response to the I/O requests sent from said I/O processors; said method comprising:

receiving, by each of at least one of said channel controllers, information specifying a second channel controller as the to-fail-over for fail-over automatically performed in association with a first channel controller's processing, said information being sent from said information processing apparatus; and automatically performing, by said storage device controlling apparatus, fail-over from the first channel controller to the second channel controller based on said specifying information.

11. A storage device controlling apparatus which includes:

a plurality of channel controllers each having a circuit board on which are formed a file access processing section receiving from an information processing apparatus requests to input and output data in files as units via a network and an I/O processor outputting to a storage device I/O requests corresponding to said requests to input and output data; and a disk controller executing input and output of data into and from said storage device in response to the I/O requests sent from said I/O processors, and managing a memory area provided by said storage device in logical volumes, which are memory areas logically set on the memory area, wherein at least one of said channel controllers comprises a section receiving data specifying an assignment of a logical volume to said channel controller, said data being sent from said information processing apparatus; and a section storing said received assignment.

12. A storage device controlling apparatus according to claim 11, wherein each of said at least one channel controller comprises a section which, when receiving one of said data input and output requests, checks based on said stored assignment whether or not the data input/output request is targeted at a logical volume assigned to said channel controller, and which controls such that, if not targeted thereat, the data input/output request is not executed.

13. A storage device controlling apparatus which includes:

a plurality of channel controllers each having a circuit board on which are formed a file access processing section receiving from an information processing apparatus requests to input and output data in files as units via a network and an I/O processor outputting to a storage device I/O requests corresponding to said requests to input and output data; and a disk controller executing input and output of data into and from said storage device in response to the I/O requests sent from said I/O processors, and managing a memory area provided by said storage device in logical volumes, which are memory areas logically set on the memory area, wherein said disk controller comprises a section which, when data is written into a first logical volume, performs a replication management process by which said data is also written into a second logical volume in order to store a copy of the data in a second logical volume, wherein at least one of said channel controllers comprises a section which receives correspondence between a first logical volume and a second logical volume where a copy of the first logical volume is stored, which correspondence is sent from said information processing apparatus, and which notifies it to said disk controller, and wherein said disk controller further comprises a section which performs said replication management process according to said notified correspondence.

14. A storage device controlling apparatus which includes:

a plurality of channel controllers each having a circuit board on which are formed a file access processing section receiving from an information processing apparatus requests to input and output data in files as units via a network and an I/O processor outputting to a storage device I/O requests corresponding to said requests to input and output data; and a disk controller executing input and output of data into and from said storage device in response to the I/O requests sent from said I/O processors, and managing a memory area provided by said storage device in logical volumes, which are memory areas logically set on the memory area, wherein said disk controller comprises a section which, when data is written into a first logical volume, performs a remote replication management process by which said data is sent to a second logical volume provided by another storage device controlling apparatus in order to store a copy of the data in a second logical volume in said another storage device controlling apparatus, wherein each of at least one of said channel controllers further comprises a section which receives correspondence between a first logical volume and a second logical volume where a copy of the first logical volume is stored, which correspondence is sent from said information processing apparatus, and notifies it to said disk controller, and wherein said disk controller further comprises a section which performs said remote replication management process according to said notified correspondence.

15. A storage device controlling apparatus which includes:

a plurality of channel controllers each having a circuit board on which are formed a file access processing section receiving from an information processing apparatus requests to input and output data in files as units via a network and an I/O processor outputting to a storage device I/O requests corresponding to said requests to input and output data; and a disk controller executing input and output of data into and from said storage device in response to the I/O requests sent from said I/O processors, wherein each of at least one of said channel controllers further comprises a section which receives setting information about backup of data stored in said storage device from said information processing apparatus; and a section which reads to-be-backed-up data stored in said storage device based on said setting information and sends the data to a backup device coupled to said network.

16. A storage device controlling apparatus according to claim 15, wherein in setting information, to-be-backed-up data is specified in files or directories as units.

17. A storage device controlling apparatus which includes:

a plurality of channel controllers each having a circuit board on which are formed a file access processing section receiving from an information processing apparatus requests to input and output data in files as units via a network and an I/O processor outputting to a storage device I/O requests corresponding to said requests to input and output data; and a disk controller executing input and output of data into and from said storage device in response to the I/O requests sent from said I/O processors, said controlling apparatus being for updating a program read from said storage device and executed by hardware formed on said circuit board, wherein each of at least one of said channel controllers further comprises a section which receives data for updating said program and sent from said information processing apparatus, and said controlling apparatus further comprising a section which updates said program stored in said storage device according to the data for updating the program.

18. A storage device controlling apparatus according to claims 17, wherein at least one of said channel controllers has a function as a Web server, and wherein data for updating one of said program is sent to said at least one channel controller by use of a Web page function provided to said information processing apparatus via said network.

19. A storage device controlling apparatus according to claim 17, wherein said program is at least one of a program for enabling an operating system executed by hardware formed on said circuit board to function and an application program operating on the operating system.

20. A storage device controlling apparatus which includes:

a plurality of channel controllers each implemented by, as components, a circuit board on which are formed a file access processing section receiving from an information processing apparatus requests to input and output data in files as units via a network and an I/O processor outputting to a storage device I/O requests corresponding to said requests to input and output data; and a disk controller executing input and output of data into and from said storage device in response to the I/O requests sent from said I/O processors, wherein each of at least one of said channel controllers further comprises a section which receives information specifying a second channel controller as the to-failover for fail-over automatically performed in association with a first channel controller's processing, said information being sent from said information processing apparatus, and said controlling apparatus further comprising a section which automatically performs fail-over from the first channel controller to the second channel controller based on said specifying information.

* * * * *